(12) United States Patent
Hirose et al.

(10) Patent No.: US 11,335,905 B2
(45) Date of Patent: May 17, 2022

(54) NEGATIVE ELECTRODE ACTIVE MATERIAL, MIXED NEGATIVE ELECTRODE ACTIVE MATERIAL, AND METHOD OF PRODUCING NEGATIVE ELECTRODE ACTIVE MATERIAL

(71) Applicant: SHIN-ETSU CHEMICAL CO., LTD., Tokyo (JP)

(72) Inventors: Takakazu Hirose, Annaka (JP); Takumi Matsuno, Annaka (JP); Reiko Sakai, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/088,300

(22) PCT Filed: Mar. 30, 2017

(86) PCT No.: PCT/JP2017/013430
§ 371 (c)(1),
(2) Date: Sep. 25, 2018

(87) PCT Pub. No.: WO2017/217077
PCT Pub. Date: Dec. 21, 2017

(65) Prior Publication Data
US 2019/0097217 A1    Mar. 28, 2019

(30) Foreign Application Priority Data
Jun. 13, 2016    (JP) .............................. JP2016-117002

(51) Int. Cl.
*H01M 4/36*    (2006.01)
*H01M 4/131*    (2010.01)
(Continued)

(52) U.S. Cl.
CPC ............ *H01M 4/366* (2013.01); *H01M 4/131* (2013.01); *H01M 4/485* (2013.01); *H01M 4/625* (2013.01);
(Continued)

(58) Field of Classification Search
CPC ....... H01M 10/0525; H01M 2004/027; H01M 4/131; H01M 4/366; H01M 4/485; H01M 4/625
See application file for complete search history.

(56) References Cited

U.S. PATENT DOCUMENTS 5,395,711 A * 3/1995 Tahara .................. H01M 4/485
429/332
7,459,236 B2    12/2008 Konishiike et al.
(Continued)

FOREIGN PATENT DOCUMENTS

CN    101276911 A    10/2008
CN    103828096 A    5/2014
(Continued)

OTHER PUBLICATIONS

Machine translation of CN 105322158 (A), Wan Lijun et al. (Year: 2016).*
(Continued)

*Primary Examiner* — Mayla Gonzalez Ramos
(74) *Attorney, Agent, or Firm* — Oliff PLC

(57) ABSTRACT

A negative electrode active material particle including: a silicon compound particle containing a silicon compound that contains oxygen, wherein the silicon compound particle contains a Li compound; and the negative electrode active material particle including aluminum phosphorous composite oxide attached to at least part of the surface, wherein the aluminum phosphorous composite oxide is a composite of $P_2O_5$ and $Al_2O_3$, and the $P_2O_5$ and the $Al_2O_3$ are in a mass
(Continued)

ratio in a range of 1.2<mass of the $P_2O_5$/mass of the $Al_2O_3$<3.0, wherein the negative electrode active material particle including aluminum phosphorous composite oxide has at least one peak in a region of a binding energy of more than 135 eV and 144 eV or less in a P 2p peak shape given in an X-ray photoelectron spectroscopy.

17 Claims, 3 Drawing Sheets

(51) Int. Cl.
  *H01M 4/485*    (2010.01)
  *H01M 10/0525*    (2010.01)
  *H01M 4/02*    (2006.01)
  *H01M 4/62*    (2006.01)

(52) U.S. Cl.
  CPC .. *H01M 10/0525* (2013.01); *H01M 2004/027* (2013.01)

(56) References Cited

U.S. PATENT DOCUMENTS

| | | | |
|---|---|---|---|
| 8,377,592 B2 | 2/2013 | Jeong et al. | |
| 2006/0099507 A1 | 5/2006 | Kogetsu et al. | |
| 2008/0176137 A1 | 7/2008 | Endo et al. | |
| 2009/0202911 A1 | 8/2009 | Fukuoka et al. | |
| 2011/0086271 A1* | 4/2011 | Lee | H01M 4/485 429/220 |
| 2011/0097627 A1 | 4/2011 | Watanabe et al. | |
| 2011/0244333 A1* | 10/2011 | Kawada | H01M 4/485 429/231.8 |
| 2013/0189562 A1 | 7/2013 | Dolle et al. | |
| 2014/0212758 A1 | 7/2014 | Kawasato et al. | |
| 2016/0111711 A1 | 4/2016 | Yoshikawa et al. | |
| 2017/0222222 A1* | 8/2017 | Lee | H01M 4/366 |

FOREIGN PATENT DOCUMENTS

| | | | |
|---|---|---|---|
| CN | 105322158 A | * | 2/2016 |
| CN | 105322158 A | | 2/2016 |
| EP | 2 372 816 A1 | | 10/2011 |
| JP | 2997741 B2 | | 1/2000 |
| JP | 2001-185127 A | | 7/2001 |
| JP | 2002-042806 A | | 2/2002 |
| JP | 2006-114454 A | | 4/2006 |
| JP | 2006-164954 A | | 6/2006 |
| JP | 2007-234255 A | | 9/2007 |
| JP | 2008-177346 A | | 7/2008 |
| JP | 2008-251369 A | | 10/2008 |
| JP | 2008-282819 A | | 11/2008 |
| JP | 2009-070825 A | | 4/2009 |
| JP | 2009-205950 A | | 9/2009 |
| JP | 2009-212074 A | | 9/2009 |
| JP | 2011-096455 A | | 5/2011 |
| JP | 2013-519990 A | | 5/2013 |
| JP | 2014-082118 A | | 5/2014 |
| JP | 2014-103019 A | | 6/2014 |
| KR | 10-2011-0040478 A | | 4/2011 |
| KR | 10-2016-0020426 A | | 2/2016 |

OTHER PUBLICATIONS

Jul. 4, 2017 International Search Report issued in International Application No. PCT/JP2017/013430.
Sep. 30, 2019 Extended European Search Report issued in European Patent Application No. 17812983.9.
Jun. 29, 2021 Search Report issued in Chinese Patent Application No. 201780028474.9.
Mar. 25, 2021 Office Action issued in Korean Patent Application No. 10-2018-7035730.
Jun. 20, 2020 Office Action and Search Report issued in Taiwanese Patent Application No. 106113602.

* cited by examiner

[FIG. 1]
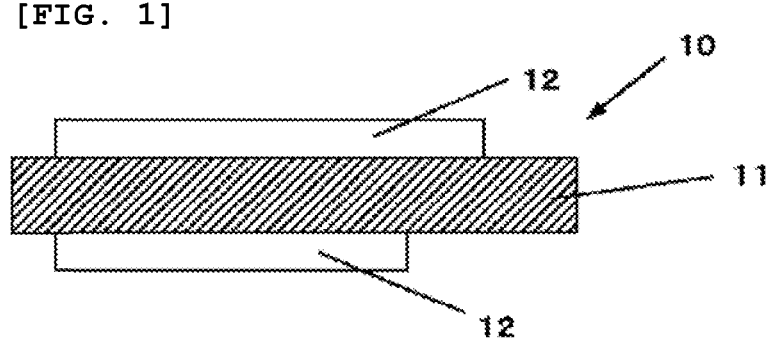
[FIG. 2]
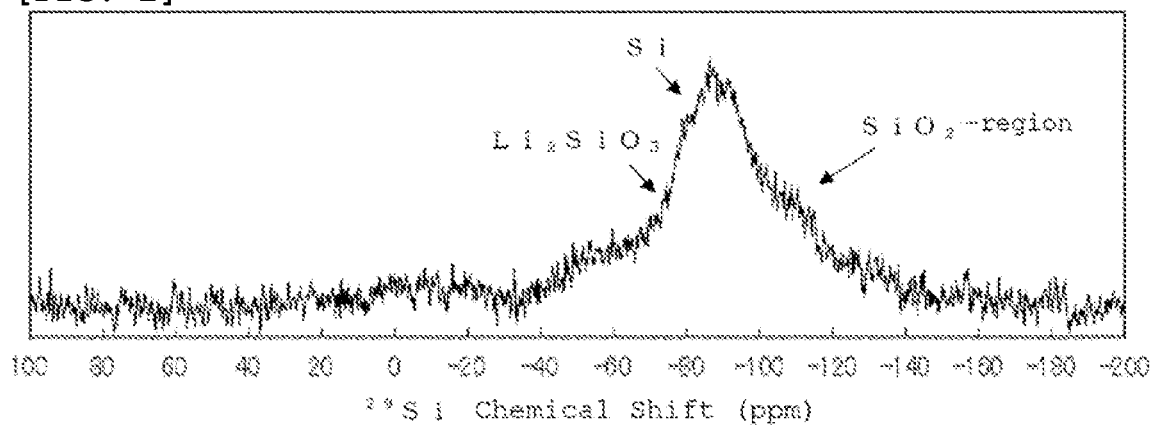
[FIG. 3]
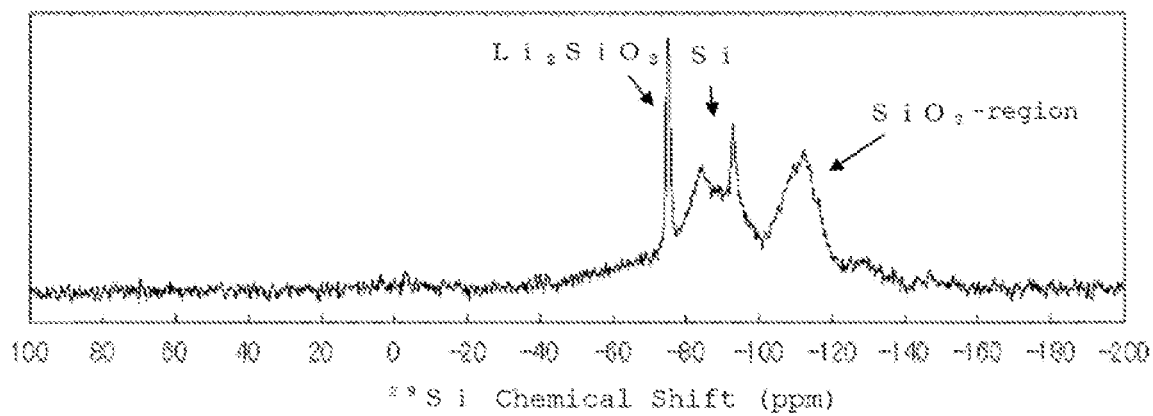

[FIG. 4]
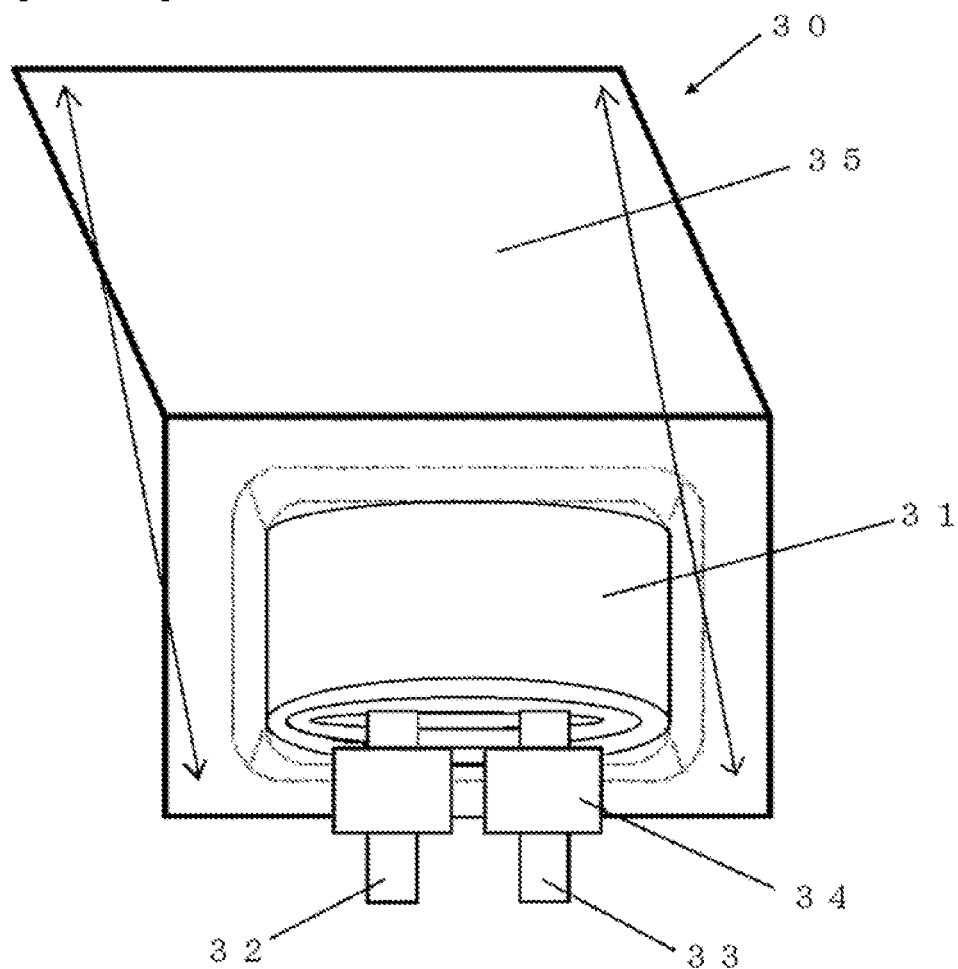
[FIG. 5]
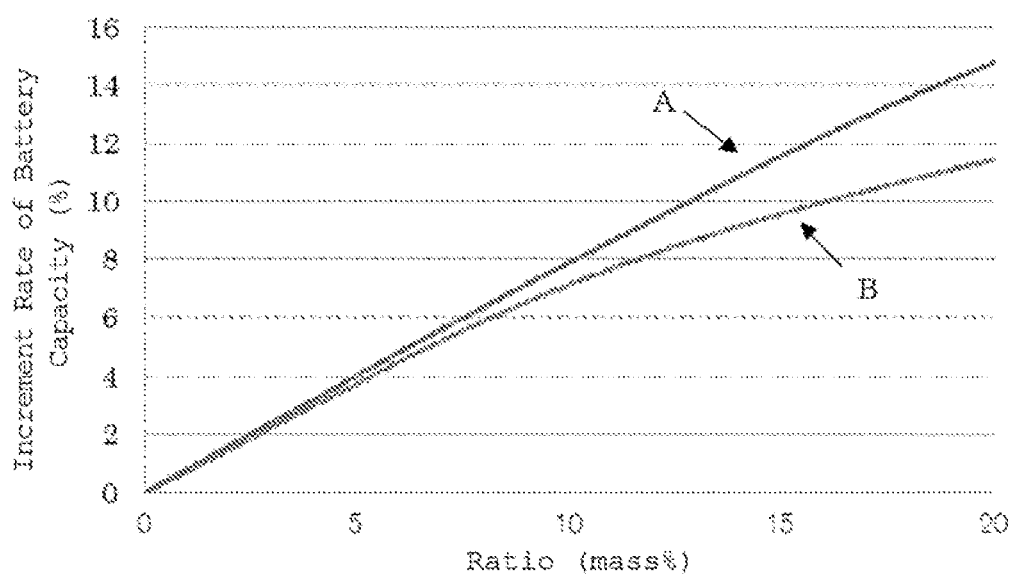

[FIG. 6]
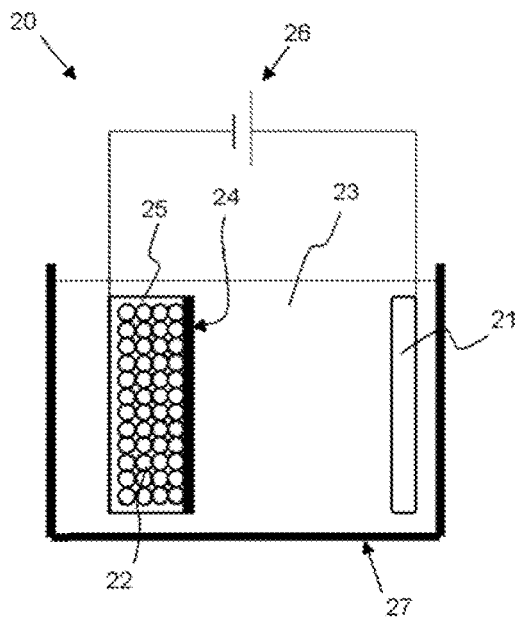
[FIG. 7]
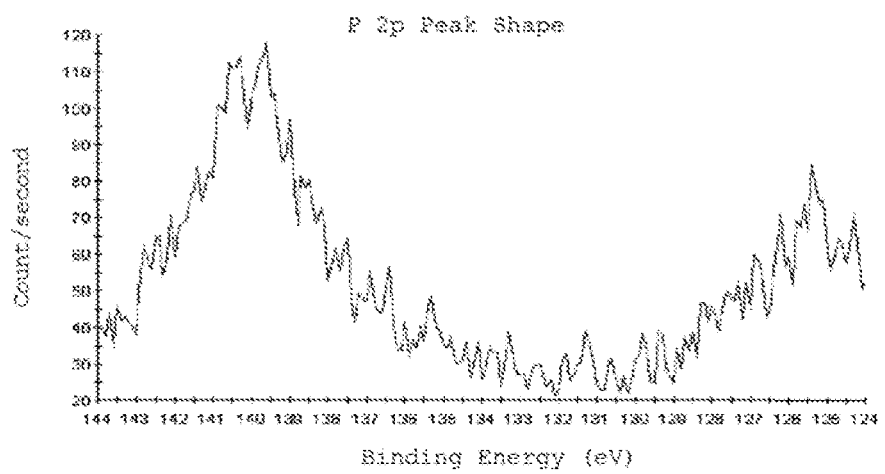
[FIG. 8]
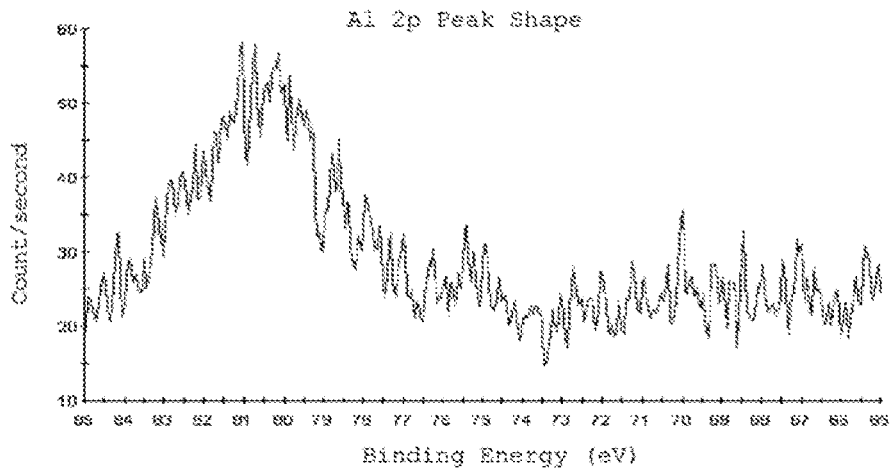

NEGATIVE ELECTRODE ACTIVE MATERIAL, MIXED NEGATIVE ELECTRODE ACTIVE MATERIAL, AND METHOD OF PRODUCING NEGATIVE ELECTRODE ACTIVE MATERIAL

TECHNICAL FIELD

The present invention relates to a negative electrode active material, a mixed negative electrode active material, and a method of producing a negative electrode active material.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon-based active materials ranges from a standard application type to an integrated type in which the materials are directly accumulated on a current collector.

Use of silicon as a main material of a negative electrode active material, however, expands or shrinks a negative electrode active material when charging or discharging, thereby making the negative electrode active material easy to break particularly near its surface layer. In addition, this active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example). Moreover, a carbon material (an electronic conduction material) is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). To improve the cycle performance, $SiO_x$ ($0.8 \leq x \leq 1.5$, the range of particle size=1 μm to 50 μm) and a carbon material are mixed and calcined at a high temperature (See Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle performance is achieved (See Patent Document 7, for example). Moreover, a metal oxide containing lithium is used to improve the battery load characteristic (See Patent Document 8, for example). To improve the cycle performance, a hydrophobic layer such as a silane compound layer is formed on the surface of a silicon material (See Patent Document 9, for example). Moreover, a silicon oxide is used and coated with graphite coating to give electric conductivity so that improved cycle performance is achieved (See Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, a particle having a silicon microcrystal phase dispersed in a silicon dioxide is used to achieve a higher battery capacity and improved cycle performance (See Patent Document 11, for example). Moreover, a silicon oxide having a silicon-to-oxygen atomicity ratio of 1:y ($0 < y < 2$) is used to improve overcharge and overdischarge performance (See Patent Document 12, for example).

CITATION LIST

Patent Literature

Patent Literature 1: JP 2001-185127 A

Patent Literature 2: JP 2002-042806 A

Patent Literature 3: JP 2006-164954 A

Patent Literature 4: JP 2006-114454 A

Patent Literature 5: JP 2009-070825 A

Patent Literature 6: JP 2008-282819 A

Patent Literature 7: JP 2008-251369 A

Patent Literature 8: JP 2008-177346 A

Patent Literature 9: JP 2007-234255 A

Patent Literature 10: JP 2009-212074 A
Patent Literature 11: JP 2009-205950 A
Patent Literature 12: JP 2997741 B1

SUMMARY OF INVENTION

Technical Problem

As described previously, small electronic devices, represented by mobile devices, have been developed to improve their performance and increase their functions in recent years. Lithium-ion secondary batteries, which are used as main sources of the devices, have been required to increase the battery capacity. The development of lithium-ion secondary batteries including negative electrodes mainly using silicon materials have been desired to solve this problem. The lithium-ion secondary batteries using silicon materials have been desired to have initial charge and discharge property and cycle performance that are close to those of a lithium-ion secondary battery using a carbon-based active material. Accordingly, silicon oxide modified by Li-insertion and partial extraction thereof has been used as a negative electrode active material to improve the cycle performance and the initial charge and discharge property. The modified silicon oxide, however, has relatively lower water resistance since it is modified using Li. This sometimes makes slurry containing the modified silicon oxide, which is prepared in producing a negative electrode, be insufficiently stabled to form gas due to the change of the slurry with time. Accordingly, it has not yet been proposed a negative electrode active material giving initial charge and discharge property and cycle performance that are close to those of a carbon-based active material, together with showing the same slurry stability as that of carbon-based active materials when it is used as a negative electrode active material for a lithium ion secondary battery.

The present invention was accomplished in view of the above-described problems. It is an object of the present invention to provide a negative electrode active material that is capable of increasing battery capacity, together with improving cycle performance and initial charge and discharge property while stabilizing the slurry when it is used as a negative electrode active material for a secondary battery, and a mixed negative electrode active material containing this negative electrode active material. It is also an object of the present invention to provide a method of producing a negative electrode active material that is capable of increasing battery capacity, together with improving cycle performance and initial charge and discharge property while stabilizing the slurry when it is used as a negative electrode active material for a secondary battery.

Solution to Problem

To achieve the foregoing object, the present invention provides a negative electrode active material containing a negative electrode active material particle;
the negative electrode active material particle comprising:
a silicon compound particle containing a silicon compound that contains an oxygen,
wherein the silicon compound particle contains a Li compound; and
the negative electrode active material particle including:
aluminum phosphorous composite oxide attached to at least part of the surface,
wherein the aluminum phosphorous composite oxide is a composite of $P_2O_5$ and $Al_2O_3$, and
the $P_2O_5$ and the $Al_2O_3$ are in a mass ratio in a range of
1.2<mass of the $P_2O_5$/mass of the $Al_2O_3$<3.0,
wherein the negative electrode active material particle including aluminum phosphorous composite oxide has at least one peak in a region of a binding energy of more than 135 eV and 144 eV or less in a P 2p peak shape given in an X-ray photoelectron spectroscopy.

The inventive negative electrode active material (hereinafter, also referred to as a silicon-based negative electrode active material) contains a negative electrode active material particle including a silicon compound particle (hereinafter, also referred to as a silicon-based negative electrode active material particles), and is capable of improving the battery capacity thereby. With the silicon compound particle containing a Li compound, it is also possible to reduce the irreversible capacity generated in charging. In the inventive negative electrode active material, aluminum phosphorous composite oxide is attached to at least part of the surface of the negative electrode active material particle, and the water resistance is improved thereby. Accordingly, the aqueous slurry mixed with this negative electrode active material, which is prepared in producing a negative electrode, is improved in stability, making it possible to reduce generation of gas. In particular, the inventive negative electrode active material has a mass ratio of $P_2O_5$ and $Al_2O_3$ in the aluminum phosphorous composite oxide in the above range, making the aqueous slurry mixed with this negative electrode active material have pH in a desirable range. The inventive negative electrode active material has at least one peak in the above region in a P 2p peak shape. Accordingly, in the aqueous slurry mixed with the inventive negative electrode active material, the slurry stability is more favorable, and generation of gas is further prevented.

The negative electrode active material particles including aluminum phosphorous composite oxide preferably has at least one peak in a region of a binding energy of 65 eV or more and 85 eV or less in an Al 2p peak shape given in an X-ray photoelectron spectroscopy.

Particularly, the negative electrode active material particle including aluminum phosphorous composite oxide preferably has a peak at an energy position higher than a binding energy of 74 eV in an Al 2p peak shape given in an X-ray photoelectron spectroscopy.

Having such a peak, the inventive negative electrode active material is mixed to form aqueous slurry thereof that has particularly favorable slurry stability, with generation of gas being prevented particularly.

The mass ratio of the $P_2O_5$ and the $Al_2O_3$ is preferably in a range of 1.3<mass of the $P_2O_5$/mass of the $Al_2O_3$<2.5.

When the mass ratio of the $P_2O_5$ and the $Al_2O_3$ is in the above range, the aqueous slurry mixed with the inventive negative electrode active material has a more preferable pH value.

The aluminum phosphorous composite oxide is preferably contained in a range of 5 mass % or less relative to the negative electrode active material particle.

When the content of the aluminum phosphorous composite oxide is in the above range, it is possible to prevent the aqueous slurry mixed with the inventive negative electrode active material from increasing the thixotropic properties.

The aluminum phosphorous composite oxide preferably has a median diameter of 5.5 μm or less.

As the median diameter is smaller, the aluminum phosphorous composite oxide has a larger specific area to facilitate to bring the effect of the present invention (e.g., slurry stability).

The silicon compound particle preferably contains at least one of $Li_2SiO_3$, $Li_4SiO_4$, and $Li_2Si_2O_5$.

When the silicon compound particle contains the above Li silicate, which is relatively stable as a Li compound, the negative electrode active material is allowed to improve the initial charge and discharge property and the cycle performance, and the stability with respect to the slurry is improved when an electrode is produced.

The silicon compound preferably contains silicon and oxygen in a ratio in a range of $SiO_x$: $0.5 \leq x \leq 1.6$.

With the negative electrode active material that contains the silicon compound like this, that is, silicon oxide shown by $SiO_x$ ($0.5 \leq x \leq 1.6$), the cycle performance becomes more favorable.

The silicon compound particle is preferably one that has a diffraction peak attributable to Si(111) crystal face in which the half value width (2θ) is 1.2° or more in an X-ray diffraction using Cu-Kα ray, and the size of the crystallite corresponding to the crystal face is 7.5 nm or less.

Using a negative electrode active material with the silicon compound particle having the above silicon crystallinity as a negative electrode active material for a lithium ion secondary battery, it is possible to obtain more favorable cycle performance and initial charge and discharge property.

The silicon compound particle is preferably one that satisfies a relationship of A>B where A is a maximum peak intensity derived from Si and Li silicate region given in the chemical shift value of −60 to −95 ppm, and B is a peak intensity derived from $SiO_2$-region given in the chemical shift value of −96 to −150 ppm, each obtained from a $^{29}Si$-MAS-NMR spectrum.

The silicon compound particle in which the amount of Si and $Li_2SiO_3$ is larger than that of $SiO_2$ component makes a negative electrode active material that is allowed to sufficiently improve the battery property by inserting Li.

It is preferable that a test cell composed of a negative electrode containing a mixture of the negative electrode active material and a carbon-based active material, together with a lithium counter electrode, exhibits a peak at an electric potential V of the negative electrode ranging from 0.40 V to 0.55 V in discharging at X times or later ($1 \leq X \leq 30$) when the test cell is subjected to charging and discharging for 30 times to graph a relationship between a derivative dQ/dV of a discharging capacity Q with respect to the electric potential V of the negative electrode on the basis of the lithium counter electrode, together with the electric potential V in each charging and discharging, where current flows in a direction in which the lithium is inserted into the negative electrode active material in the charging and current flows in a direction in which the lithium is extracted from the negative electrode active material in the discharging.

The above peak in the V−dQ/dV curve resembles a peak of a silicon material, and the discharge curve rises sharply at higher electric potential, which makes it easy to develop the capacity in designing a battery. When the above peak is exhibited within 30 times of charging and discharging, the negative electrode active material can form a stable bulk.

It is preferable that the median diameter of the negative electrode active material be 1.0 μm or more and m or less.

When the median diameter is 1.0 μm or more, it is possible to prevent an increase of battery irreversible capacity due to an increase of the surface area per mass. On the other hand, when the median diameter is 15 μm or less, the particles are hard to break to hardly form a new surface.

It is preferable that the negative electrode active material particle have a surface layer portion containing a carbon material.

When the negative electrode active material particle has a carbon material at the surface layer as described above, the electric conductivity is improved. Accordingly, using a negative electrode active material containing the negative electrode active material particle like this as a negative electrode active material for a secondary battery, it is possible to improve the battery property.

In this case, the average thickness of the carbon material is preferably 5 nm or more and 5000 nm or less.

When the average thickness of the carbon material is 5 nm or more, the electric conductivity is successfully improved. When the average thickness of the carbon material coating is 5000 nm or less, it is possible to secure sufficient amount of silicon compound particle using a negative electrode active material containing the negative electrode active material particles like this for a lithium ion secondary battery, thereby making it possible to prevent lowering of the battery capacity.

The present invention further provides a mixed negative electrode active material, comprising the inventive negative electrode active material and a carbon-based active material.

When the material for forming a negative electrode active material layer contains a carbon-based active material together with the inventive silicon-based negative electrode active material, it is possible to improve the electric conductivity of the negative electrode active material layer and to ease the expanding stress due to charging. The battery capacity is also increased successfully by mixing a silicon-based negative electrode active material and a carbon-based active material.

The present invention further provides a method of producing a negative electrode active material containing a negative electrode active material particle including a silicon compound particle, comprising the steps of:

preparing negative electrode active material particles each containing a lithium inserted silicon compound particle, comprising:

preparing a silicon compound particle containing a silicon compound that contains an oxygen, inserting lithium into the silicon compound particle, attaching aluminum phosphorous composite oxide of composite of $P_2O_5$ and $Al_2O_3$ onto at least part of the surfaces of the negative electrode active material particles so as to have a mass ratio of the $P_2O_5$ and the $Al_2O_3$ in a range of 1.2<mass of the $P_2O_5$/mass of the $Al_2O_3$<3.0, and selecting a negative electrode active material particle having at least one peak in a region of a binding energy of more than 135 eV and 144 eV or less in a P 2p peak shape given in an X-ray photoelectron spectroscopy from the negative electrode active material particles on which the aluminum phosphorous composite oxide is attached.

The negative electrode active material produced by such a production method excels in water resistance, and hardly causes violent reaction with aqueous slurry thereby. That is, the negative electrode active material like this is excellent in stability with respect to the slurry in producing an electrode. The production method like this successfully produces a negative electrode active material that has high capacity as well as favorable cycle performance and initial charge and discharge property when it is used as a negative electrode active material for a secondary battery.

The aluminum phosphorous composite oxide used in the step of attaching is preferably a mixture of aluminum tertiary phosphate and aluminum metaphosphate.

The production method like this makes it possible to control the mass ratio of $P_2O_5$ and the $Al_2O_3$ conveniently by changing the mixing ratio of aluminum tertiary phosphate and aluminum metaphosphate.

Advantageous Effects of Invention

The inventive negative electrode active material brings high capacity and favorable cycle performance and initial charge and discharge property when it is used as a negative electrode active material for a secondary battery. A mixed negative electrode active material containing this negative electrode active material also brings the same effects. The inventive negative electrode active material and mixed negative electrode active material are excellent in slurry stability in production of an electrode.

The inventive method of producing a negative electrode active material successfully stabilizes the slurry in production of an electrode, making it possible to produce a negative electrode active material that has high capacity as well as favorable cycle performance and initial charge and discharge property when it is used as a negative electrode active material for a secondary battery.

BRIEF DESCRIPTION OF DRAWINGS

FIG. 1 is a sectional view showing an example of configuration of a negative electrode for a non-aqueous electrolyte secondary battery that contains the inventive negative electrode active material;

FIG. 2 is an example of $^{29}$Si-MAS-NMR spectrum measured for the silicon compound particle when it is modified by oxidation and reduction method;

FIG. 3 is an example of $^{29}$Si-MAS-NMR spectrum measured for the silicon compound particle when it is modified by thermal doping method;

FIG. 4 is an exploded diagram showing an example of configuration of a lithium-ion secondary battery (a laminate film type) that contains the inventive negative electrode active material;

FIG. 5 is a graph showing relationship between the ratio of silicon-based negative electrode active material particles relative to the whole amount of negative electrode active material and an increment rate of battery capacity of a secondary battery;

FIG. 6 is a schematic diagram showing an example of an electrochemical Li doping modification apparatus that can be used for the inventive method of producing a negative electrode active material;

FIG. 7 is a P 2p peak shape measured in Example 1-3 of the present invention;

FIG. 8 is an Al 2p peak shape measured in Example 1-3 of the present invention.

DESCRIPTION OF EMBODIMENTS

Hereinafter, embodiments of the present invention will be described, but the present invention is not limited thereto.

As described above, a negative electrode mainly made of a silicon material has been investigated to be used as a negative electrode of a lithium-ion secondary battery as a method to increase the battery capacity of lithium-ion secondary battery. The lithium-ion secondary battery using this silicon material is required to have initial charge and discharge property as well as cycle performance that are close to those of a lithium-ion secondary battery using a carbon-based active material. Additionally, the silicon material is required to have slurry stability that is close to that of carbon-based active material. However, it has not yet been proposed a negative electrode active material that gives initial charge and discharge property as well as cycle performance that are equal to those of carbon-based active material, together with slurry stability equal to that of carbon-based active material when it is used as a negative electrode active material for a lithium ion secondary battery.

Accordingly, the inventors have diligently investigated to obtain a negative electrode active material that is capable of increasing the battery capacity and improving the cycle performance as well as initial charge and discharge property while stabilizing the slurry when it is used as a negative electrode active material for a secondary battery; thereby providing the present invention.

The inventive negative electrode active material contains negative electrode active material particles. The negative electrode active material particle contains a silicon compound particle containing a silicon compound that contains an oxygen. This silicon compound particle contains a Li compound. The negative electrode active material particle further comprises aluminum phosphorous composite oxide attached to at least part of the surface. Herein, "attached to" is a concept including "coating". Accordingly, in the present invention, the surface of the negative electrode active material particle may be coated with the aluminum phosphorous composite oxide at least partly, for example.

The inventive negative electrode active material contains negative electrode active material particles containing silicon compound particles, and successfully improves the battery capacity thereby. The silicon compound particle contains a Li compound, and makes it possible to decrease irreversible capacity caused in charging thereby. The inventive negative electrode active material has aluminum phosphorous composite oxide attached to at least part of the surfaces of the negative electrode active material particles, and has higher water resistance thereby. As a result, the aqueous slurry mixed with this negative electrode active material, which is prepared in producing a negative electrode, is improved in stability, and generation of gas is successfully decreased thereby.

The aluminum phosphorous composite oxide in the present invention is a composite of $P_2O_5$ and $Al_2O_3$. The mass ratio of $P_2O_5$ and $Al_2O_3$ is in a range of 1.2<mass of the $P_2O_5$/mass of the $Al_2O_3$<3.0. That is, in the aluminum phosphorous composite oxide, when it is divided into $P_2O_5$ and $Al_2O_3$, the mass ratio of $P_2O_5$ and $Al_2O_3$ is in a range of 1.2<mass of the $P_2O_5$/mass of the $Al_2O_3$<3.0. As described above, the aluminum phosphorous composite oxide of the inventive negative electrode active material has a mass ratio of $P_2O_5$ and $Al_2O_3$ in the above range, thereby making the pH of the aqueous slurry mixed with this negative electrode active material be within a desired range. In case of mixing a negative electrode active material in which this mass ratio is 1.2 or less to aqueous slurry, the pH of the aqueous slurry gets too high, and stability of the slurry becomes worse. In case of mixing a negative electrode active material in which this mass ratio is 3.0 or more to aqueous slurry, the pH of the aqueous slurry gets too low, and the slurry stability becomes worse, thereby tending to generate gas.

In the present invention, the mass ratio of the $P_2O_5$ and the $Al_2O_3$ is preferably in a range of 1.3<mass of the $P_2O_5$/mass of the $Al_2O_3$<2.5. When the mass ratio of the $P_2O_5$ and the $Al_2O_3$ is in the above range, the aqueous slurry mixed with the inventive negative electrode active material has more preferable pH value. Incidentally, this mass ratio is more preferably 1.4 or more and 2.2 or less.

In the present invention, these negative electrode active material particles having aluminum phosphorous composite oxide attached thereto have at least one peak in a region of a binding energy of more than 135 eV and 144 eV or less in a P 2p peak shape given in an X-ray photoelectron spectroscopy. Accordingly, the aqueous slurry mixed with the inventive negative electrode active material has more favorable slurry stability, and generation of gas is further prevented.

In this case, the negative electrode active material particle having aluminum phosphorous composite oxide attached thereto preferably has at least one peak in a region of a binding energy of 65 eV or more and 85 eV or less in an Al 2p peak shape given in an X-ray photoelectron spectroscopy in addition to the peak described above. Particularly, the negative electrode active material particle having aluminum phosphorous composite oxide attached thereto preferably has a peak at an energy position higher than a binding energy of 74 eV in an Al 2p peak shape given in an X-ray photoelectron spectroscopy. Having such a peak, the inventive negative electrode active material is mixed to aqueous slurry to bring particularly favorable slurry stability, and generation of gas is particularly prevented.

<Negative Electrode for Non-Aqueous Electrolyte Secondary Battery>

First, a negative electrode for a non-aqueous electrolyte secondary battery will be described. FIG. 1 shows a configuration of cross section of a negative electrode for a non-aqueous electrolyte secondary battery (hereinafter, also referred to as a "negative electrode") in an embodiment of the present invention.

[Configuration of Negative Electrode]

As shown in FIG. 1, the negative electrode 10 is configured to have the negative electrode active material layer 12 on the negative electrode current collector 11. This negative electrode active material layer 12 may be disposed on one side or both sides of the negative electrode current collector 11. When the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material used for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector. Particularly, in case of having an active material layer that expands in charging, the current collector containing the above elements can prevent deformation of an electrode including the current collector. Each content of the contained elements is not particularly limited, but is preferably 100 ppm by mass or less. This brings finer effect of preventing deformation. Such effect of preventing deformation further improves the cycle performance.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 contains the inventive negative electrode active material, which is capable of occluding and releasing lithium ions. In view of battery design, other materials may be further contained, such as a negative electrode binding agent (binder) or a conductive assistant agent. The negative electrode active material contains a negative electrode active material particle, and the negative electrode active material particle contains a silicon compound particle containing a silicon compound that contains an oxygen.

The negative electrode active material layer 12 may contain a mixed negative electrode active material that contains the inventive negative electrode active material (silicon-based negative electrode active material) and a carbon-based active material. This makes it possible to decrease the electric resistance of the negative electrode active material layer and to ease the expanding stress due to charging. As the carbon-based active material, pyrolytic carbons, cokes, glassy carbon fiber, baked organic polymer compounds, carbon black, and the like are usable.

In the mixed negative electrode active material, the mass ratio of the silicon-based negative electrode active material is preferably 6 mass % or more relative to the sum of masses of the inventive silicon-based negative electrode active material and the carbon-based active material. When the mass ratio of the silicon-based negative electrode active material is 6 mass % or more relative to the sum of masses of the silicon-based negative electrode active material and the carbon-based active material, it is possible to securely improve the battery capacity.

As described above, the inventive negative electrode active material is a silicon oxide material containing a silicon compound particle, with the silicon compound particle containing a silicon compound that contains an oxygen. This silicon compound is preferably composed of silicon and oxygen, the ratio of which is in a range of $SiO_x$: $0.5 \leq x \leq 1.6$. When "x" is 0.5 or more, the oxygen ratio is increased than silicon single substance, making the cycle performance favorable. When "x" is 1.6 or less, the silicon oxide is prevented from increasing the resistivity too high and is preferable. Particularly, the composition of $SiO_x$ is preferable when "x" is close to 1 because higher cycle performance is successfully obtained. Incidentally, the composition of silicon compound in the present invention does not necessarily means purity of 100%, and may contain a small quantity of impurity elements.

In the inventive negative electrode active material, the silicon compound particle contains a Li compound. More specifically, the silicon compound particle preferably contains at least one of $Li_2SiO_3$, $Li_4SiO_4$, and $Li_2Si_2O_5$. In these silicon compounds, $SiO_2$ component portion, which is changed to unstable during insertion and extraction of lithium in charging and discharging the battery, is previously modified to another lithium silicate. Accordingly, the irreversible capacity generated in charging is successfully decreased. By containing these Li silicates, which are relatively stable as a Li compound, the stability with respect to slurry is more improved in producing an electrode.

The battery properties are improved when the silicon compound particle contains at least one of $Li_4SiO_4$, $Li_2SiO_3$, and $Li_2Si_2O_5$ in the bulk. The battery properties are more improved when two or more, particularly three kinds of the Li compound described above are combined. Incidentally, these lithium silicates can be determined by Nuclear Magnetic Resonance (NMR) or X-ray photoelectron spectroscopy (XPS). The measurement of XPS and NMR can be performed under the following conditions, for example. XPS
- Apparatus: an X-ray photoelectron spectroscopy apparatus
- X-ray Source: a monochromatic Al-Kα ray
- X-ray Spot Diameter: 100 µm
- Ar-ion Sputtering Gun Conditions: 0.5 kV/2 mm×2 mm $^{29}$Si-MAS-NMR (Magic Angle Spinning-Nuclear Magnetic Resonance)
- Apparatus: a 700-NMR spectroscope made by Bruker Corp.
- Probe: a 4-mm-HR-MAS rotor, 50 µL
- Sample Rotation Speed: 10 kHz
- Temperature of Measurement Environment: 25° C.

The silicon compound particle preferably has a diffraction peak attributable to Si(111) crystal face in which the half value width (2θ) is 1.2° or more in an X-ray diffraction using Cu-Kα ray, and the size of the crystallite corresponding to the crystal face is 7.5 nm or less. This peak appears near 2θ=28.4±0.50 when the crystallinity is high (when the half value width is narrow). In the silicon compound particle, the silicon compound is better when the silicon crystallinity is lower. Particularly, when the content of Si crystal is smaller, it is possible to improve the battery capacity and to form a stable Li compound.

The inventive negative electrode active material is preferable when the silicon compound particle satisfies a relationship of A>B where A is a maximum peak intensity derived from Si and Li silicate region given in the chemical shift value of −60 to −95 ppm, and B is a peak intensity derived from SiO$_2$-region given in the chemical shift value of −96 to −150 ppm, each obtained from a $^{29}$Si-MAS-NMR spectrum. With the silicon compound particle in which the amount of silicon component or Li$_2$SiO$_3$ is relatively larger based on the SiO$_2$ component, it is possible to obtain sufficient effect for improving the battery properties by Li insertion. Incidentally, the conditions for measuring $^{29}$Si-MAS-NMR may be the same as those described above.

In the inventive negative electrode active material, the negative electrode active material particle preferably has a surface layer containing a carbon material. The negative electrode active material particle is improved in electric conductivity by containing a carbon material in the surface layer. Accordingly, when the negative electrode active material containing the negative electrode active material particles like this is used as a negative electrode active material for a secondary battery, the battery performances are successfully improved.

In this case, the carbon material of the surface layer portion of the negative electrode active material particle preferably has an average thickness of 5 nm or more and 5000 nm or less. When the average thickness of the carbon material is 5 nm or more, the electric conductivity is improved. When the average thickness of the carbon material coating is 5000 nm or less, it is possible to prevent lowering of battery capacity in case of using a negative electrode active material that contains such a negative electrode active material particle as a negative electrode active material for a lithium ion secondary battery.

The average thickness of this carbon material can be calculated by the following procedure, for example. First, the negative electrode active material particles are observed through transmission electron microscope (TEM) at an optional magnification. This magnification is preferably a magnification by which the thickness of carbon material can be determined visually so as to measure the thickness. Subsequently, the thicknesses of carbon material are measured at 15 random points. In this case, it is preferable to set the measuring points widely and randomly as possible without focusing a particular place. Lastly, the average value of the thicknesses of carbon material at the 15 points are calculated.

The covering rate of carbon material is not particularly limited, but is desirable to be as high as possible. The covering rate of 30% or more improves the electric conductivity further, and is preferable. The method for coating the carbon material is not particularly limited, but a method of carbonizing saccharide and a pyrolysis method of hydrocarbon gas are preferable since they can improve the covering rate.

The negative electrode active material particle preferably has a median diameter (D$_{50}$: the particle diameter when the accumulated volume becomes 50%) of 1.0 µm or more and 15 µm or less. When the median diameter is in the above range, lithium ions are easily occluded and released in charging and discharging, and the negative electrode active material particle becomes hard to break. When the median diameter is 1.0 µm or more, it is possible to decrease the surface area per mass of the negative electrode active material particle to prevent increase of the irreversible battery capacity. On the other hand, when the median diameter is 15 µm or less, the particle becomes hard to break to hardly form a new surface.

The aluminum phosphorous composite oxide preferably has a median diameter of 5.5 µm or less. As the median diameter is smaller, the aluminum phosphorous composite oxide has larger specific surface area, and the effect of the present invention (slurry stability, etc.) is exhibited easily. With the relatively small median diameter, the aluminum phosphorous composite oxide like this hardly acts as a foreign substance. Accordingly, there rarely occurs a situation that the aluminum phosphorous composite oxide like this enters to an electrode as a foreign substance to separate out Li on the electrode.

The content of the aluminum phosphorous composite oxide is preferably in a range of 5 mass % or less relative to the negative electrode active material particles. When the content of the aluminum phosphorous composite oxide is in the above range, it is possible to prevent aqueous slurry mixed with the inventive negative electrode active material from increasing the thixotropic properties. The lower limit of the content of the aluminum phosphorous composite oxide can be 0.1 mass % relative to the negative electrode active material particles, for example. The content of the aluminum phosphorous composite oxide is more preferably 0.5 mass % or more and 2 mass % or less relative to the negative electrode active material particles, particularly preferably 0.8 mass % or more and 1.5 mass % or less relative to the negative electrode active material particles.

The inventive negative electrode active material (silicon-based negative electrode active material) is preferably one to make a test cell such that the test cell composed of a negative electrode containing a mixture of the silicon-based negative electrode active material and a carbon-based active material, together with a lithium counter electrode, exhibits a peak at an electric potential V of the negative electrode ranging from 0.40 V to 0.55 V in discharging at X times or later (1≤X≤30) when the test cell is subjected to charging and discharging for 30 times to graph a relationship between a derivative dQ/dV of a discharging capacity Q with respect to the electric potential V of the negative electrode on the basis of the lithium counter electrode, together with the electric potential V in each charging and discharging, where current flows in a direction in which the lithium is inserted into the silicon-based negative electrode active material in the charging and current flows in a direction in which the lithium is extracted from the silicon-based negative electrode active material in the discharging. The above peak in the V–dQ/dV curve resembles a peak of a silicon material, and the discharge curve rises sharply at higher electric potential, which make it easy to develop the capacity in designing a battery. When the above peak is exhibited within 30 times of charging and discharging, the negative electrode active material is judged to form a stable bulk. When the above peak is exhibited within 30 times of charging and discharging, the peak will be stronger and stable thereafter.

As the negative electrode binder contained in the negative electrode active material layer, any one or more of polymer material, synthetic rubber, and so on are usable, for example. Illustrative examples of the polymer material includes polyvinylidene fluoride, polyimide, polyamideimide, aramid, polyacrylic acid, lithium polyacrylate, and carboxymethyl cellulose. Illustrative examples of the synthetic rubber includes styrene-butadiene rubber, fluororubber, and ethylene-propylene-diene.

As the negative electrode conductive assistant agent, any one or more of a carbon material, such as carbon black, acetylene black, graphite, ketjen black, carbon nanotube, and carbon nanofiber can be used.

The negative electrode active material layer is formed by an application method, for example. The application method is a method in which a silicon-based negative electrode active material is mixed with the above binder and so on, optionally with a conductive assistant agent or a carbon-based active material, and then dispersed to organic solvent, water, or the like so as to be applied.

[Method of Producing Negative Electrode]

The negative electrode can be produced by the following procedures, for example. First, a production method of a negative electrode active material used for a negative electrode will be described. To begin with, a silicon compound particle is prepared containing a silicon compound that contains an oxygen. Then, lithium is inserted into the silicon compound particle. In this way, negative electrode active material particles each containing a lithium inserted silicon compound particle is prepared. Subsequently, aluminum phosphorous composite oxide of composite of $P_2O_5$ and $Al_2O_3$ is attached onto at least part of the surfaces of the negative electrode active material particles so as to have a mass ratio of the $P_2O_5$ and the $Al_2O_3$ in a range of 1.2<mass of the $P_2O_5$/mass of the $Al_2O_3$<3.0. Then, from the negative electrode active material particles on which the aluminum phosphorous composite oxide is attached, negative electrode active material particles are selected having at least one peak in a region of a binding energy of more than 135 eV and 144 eV or less in a P 2p peak shape given in an X-ray photoelectron spectroscopy.

The negative electrode active material produced by such a production method excels in water resistance, and hardly causes violent reaction with aqueous slurry thereby. That is, the negative electrode active material like this is excellent in stability with respect to the slurry in producing an electrode. The production method like this successfully produces a negative electrode active material that has high capacity as well as favorable cycle performance and initial charge and discharge property when it is used as a negative electrode active material for a secondary battery.

Subsequently, the inventive method of producing a negative electrode active material will be described more specifically.

First, a silicon compound particle containing a silicon compound that contains an oxygen is prepared. Hereinafter describes a case of using silicon oxide shown by $SiO_x$ (0.5≤x≤1.6) as the silicon compound that contains an oxygen. In the beginning, a raw material capable of generating a silicon oxide gas is heated at a temperature range of 900 to 1600° C. under reduced pressure in the presence of inert gas to generate the silicon oxide gas. At this time, the raw material can be a mixture of metallic silicon powder and silicon dioxide powder. In consideration of the existence of oxygen on the surface of the metallic silicon powder and a minute amount of oxygen in a reaction furnace, the mixing molar ratio is desirably in a range of 0.8<metallic silicon powder/silicon dioxide powder<1.3.

The generated silicon oxide gas is solidified and deposited on an adsorption plate. Then, the deposit of silicon oxide is taken out after the temperature in the reaction furnace has been decreased to 100° C. or less, followed by pulverizing with a ball mill or a jet mill to form powder. As described above, the silicon compound particle is successfully prepared. It is to be noted that the Si crystallite in the silicon compound particle can be controlled by altering the vaporization temperature of a raw material capable of generating a silicon oxide gas or heat treatment after forming a silicon compound particle.

On the surface layer of the silicon compound particle, a carbon material layer may be formed. As a method to form the carbon material layer, a thermal decomposition CVD method is desirable. Hereinafter, an example of the method for forming a carbon material layer by thermal decomposition CVD method will be described.

First, silicon compound particles are set in a furnace. Then, a hydrocarbon gas is introduced into the furnace, and the temperature in the furnace is raised. The pyrolysis temperature is preferably, but not particularly limited to, 1200° C. or less, more preferably 950° C. or less. When the pyrolysis temperature is 1200° C. or less, it is possible to prevent unintentional disproportionation of active material particles. After raising the furnace temperature to a prescribed temperature, a carbon layer is formed onto the surface of the silicon compound particle. The hydrocarbon gas to be a raw material of the carbon material is not particularly limited, but preferably has a composition of $C_nH_m$ where n≤3. When n≤3, it is possible to decrease the production cost and to improve the properties of the decomposition products.

Subsequently, Li is inserted into the silicon compound particle prepared as described above. In this way, negative electrode active material particles each containing a lithium inserted silicon compound particle is prepared. That is, the silicon compound particle is modified, and a Li compound is formed in the silicon compound particle through this procedure. The insertion of Li is preferably performed by a thermal doping method.

In modification by thermal doping method, the silicon compound particle can be modified by mixing with LiH powder or Li powder, followed by heating in a non-oxidizing atmosphere. As the non-oxidizing atmosphere, an Ar atmosphere and so on are usable. More specifically, LiH powder or Li powder and silicon compound particles are sufficiently mixed in an Ar atmosphere at first, followed by sealing and homogenizing by stirring the whole sealed container. Subsequently, this is heated in a range of 700° C. to 750° C. to be modified. In this case, for extracting Li from the silicon compound particle, the heated powder may be sufficiently cooled, and then washed with alcohol, alkaline water, weak acid, or pure water.

The insertion of Li into the silicon active material particles may also be performed by an oxidation and reduction method. In the modification by an oxidation and reduction method, lithium can be inserted by immersing silicon active material particles into solution-A in which lithium is dissolved into ether solvent, for example. This solution-A may also contain a polycyclic aromatic compound or a linear polyphenylene compound additionally. After inserting lithium, active lithium can be extracted from the silicon active material particles by immersing the silicon active material particles into solution-B that contains a polycyclic aromatic compound or its derivative. Illustrative examples of solvents usable for this solution-B include ether-based solvents, ketone-based solvents, ester-based solvents, alcohol-based solvents, amine-based solvents, and mixture thereof. The obtained silicon active material particles may be heat treated in an inert gas after being immersed to solution-A. The heat treatment allows the Li compound to be stable. This may be followed by a method such as washing with alcohol, alkaline water in which lithium carbonate is dissolved, weak acid, pure water, and the like.

As the ether-based solvents used in the solution-A, diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, or mixed solvents thereof may be used. Among these, in particular, tetrahydrofuran, dioxane and 1,2-dimethoxy ethane may be preferably used. These solvents are preferable to be dewatered and preferable to be deoxygenized.

Further, as the polycyclic aromatic compound contained in the solution-A, one or more kinds of naphthalene, anthracene, phenanthrene, naphthacene, pentacene, pyrene, picene, triphenylene, coronene, chrysene, and derivatives thereof are usable, and, as the straight chain polyphenylene compound contained in the solution-A, one or more kinds of biphenyl, terphenyl, and derivatives thereof may be used.

As the polycyclic aromatic compound contained in the solution-B, one or more kinds of naphthalene, anthracene, phenanthrene, naphthacene, pentacene, pyrene, picene, triphenylene, coronene, chrysene, and derivatives thereof may be used.

Further, as the ether-based solvent of the solution-B, diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, or the like may be used.

As the ketone-based solvent, acetone, acetophenone or the like may be used.

As the ester-based solvent, methyl formate, methyl acetate, ethyl acetate, propyl acetate, and isopropyl acetate may be used.

As the alcohol-based solvent, methanol, ethanol, propanol, and isopropyl alcohol may be used.

As the amine-based solvent, methyl amine, ethyl amine, and ethylene diamine may be used.

The modification may be performed by an electrochemical doping method. In this case, the materials formed in the bulk can be controlled by adjusting insertion potential or extraction potential, or changing current density, bath temperature, or the times of insertion and extraction. For example, bulk modification can be performed with a bulk modification apparatus 20 shown in FIG. 6. Incidentally, the structure of apparatus is not particularly limited to the structure of bulk modification apparatus 20.

The bulk modification apparatus 20 shown in FIG. 6 includes a bath 27 filled with an electrolytic solution 23, a counter electrode 21 provided within the bath 27 and connected to one terminal of a power source 26, a powder storage container 25 provided within the bath 27 and connected to the other terminal of the power source 26, and a separator 24 provided between the counter electrode 21 and the powder storage container 25. In the powder storage container 25, silicon compound particles 22 are stored.

In the modification by an electrochemical doping method, lithium is successfully inserted into silicon compound particles by dissolving lithium salt into the electrolytic solution 23 or a Li-containing compound is combined as the counter electrode 21, followed by applying voltage between the powder storage container 25 and the counter electrode 21 with the power source 26 to flow current.

By inserting Li electrochemically, Li is inserted into sites other than those of Li inserted by a thermal process. Accordingly, by performing electrochemical doping after thermal doping, for example, it becomes possible to improve the initial efficiency additionally, and to ease the growing of silicon crystallite in the thermal process.

As a lithium source used for the electrochemical doping method, it is possible to use at least one of metal lithium, phosphate of transition metal and lithium, lithium oxide with Ni, lithium oxide with Co, lithium oxide with Mn, lithium nitrate, and lithium halide. Incidentally, the lithium salt may be in any form. That is, the lithium salt may be used as the counter electrode 21 or may be uses as an electrolyte of electrolytic solution 23.

In this case, as the solvent of the electrolytic solution 23, it is possible to use dimethyl carbonate, ethylene carbonate, propylene carbonate, diethyl carbonate, dioxane, diglyme, triglyme, tetraglyme, and mixture thereof. As the electrolyte of the electrolytic solution 23, it is possible to use $LiBF_4$, $LiPF_6$, $LiClO_4$, and derivatives thereof. Particularly, $LiNO_3$ and LiCl can also be used as the electrolyte that also acts as Li source. The electrochemical doping method may also include a process of extracting Li from the silicon compound particles after inserting Li. This makes it possible to adjust Li amount to be inserted to the silicon compound particles.

Incidentally, when the modification is performed by a thermal doping method, the $^{29}$Si-MAS-NMR spectrum obtained for the silicon compound particle is different from that in case of using an oxidation and reduction method. FIG. 2 shows an example of $^{29}$Si-MAS-NMR spectrum measured for the silicon compound particle when it is modified by oxidation and reduction method. In FIG. 2, the peak given near −75 ppm is a peak attributable to $Li_2SiO_3$, and the peak given in −80 to −100 ppm is a peak attributable to Si. Incidentally, there can be a peak of Li silicate other than $Li_2SiO_3$ and $Li_4SiO_4$ ranging from −80 to −100 ppm in some cases.

FIG. 3 shows an example of $^{29}$Si-MAS-NMR spectrum measured for the silicon compound particle when it is modified by thermal doping method. In FIG. 3, the peak given near −75 ppm is a peak attributable to $Li_2SiO_3$, and the peak given in −80 to −100 ppm is a peak attributable to Si. Incidentally, there can be a peak of Li silicate other than $Li_2SiO_3$ and $Li_4SiO_4$ ranging from −80 to −100 ppm in some cases. Incidentally, the peak of $Li_4SiO_4$ can be determined from the XPS spectrum.

Subsequently, aluminum phosphorous composite oxide of composite of $P_2O_5$ and $Al_2O_3$ is attached onto at least part of the surfaces of negative electrode active material particles that contains a lithium inserted silicon compound particle so as to have a mass ratio of the $P_2O_5$ and the $Al_2O_3$ in a range of 1.2<mass of the $P_2O_5$/mass of the $Al_2O_3$<3.0.

Illustrative examples of the aluminum phosphorous composite oxide include aluminum phosphates. Each aluminum phosphate can be described as a composite of $Al_2O_3$ and $P_2O_5$ when it is divided thereto. The content ratio of $P_2O_5$ and the $Al_2O_3$ is different in each kind of aluminum phosphate. Accordingly, the mass ratio can be adjusted by appropriately selecting the kind of aluminum phosphate to be used. For example, using aluminum tertiary phosphate ($AlPO_4$) or a mixture of aluminum tertiary phosphate and aluminum metaphosphate ($Al(PO_3)_3$) as the aluminum phosphorous composite oxide, it is possible to attach the aluminum phosphorous composite oxide onto the surfaces of negative electrode active material particles so as to have a mass ratio of the $P_2O_5$ and the $Al_2O_3$ in the range described above.

Particularly, it is preferable to use the mixture described above as the aluminum phosphorous composite oxide. Since aluminum metaphosphate has higher $P_2O_5$ content compared to aluminum tertiary phosphate, the aluminum phosphorous composite oxide is allowed to increase the $P_2O_5$ content by mixing aluminum metaphosphate. Accordingly, the mass ratio of $P_2O_5$ and the $Al_2O_3$ can be adjusted conveniently by changing the mixing ratio of aluminum tertiary phosphate and aluminum metaphosphate. In general, aluminum tertiary phosphate alone has pH near 7, and aluminum metaphosphate alone has pH near 3.5. Accordingly, by changing their mixing ratio, it is possible to adjust pH of aqueous slurry mixed with the inventive negative electrode active material to adjust the stability of the slurry. That is, it is possible to improve the stability of the slurry further using the mixture with an appropriate mixing ratio. Incidentally, when aluminum tertiary phosphate is solely used as the aluminum phosphorous composite oxide, aqueous slurry mixed with the inventive negative electrode active material has pH at alkaline side (pH of 11 or more), which makes the slurry somewhat unstable but is in a permissible lower margin. On the other hand, when aluminum metaphosphate is solely used as the aluminum phosphorous composite oxide, the mass ratio of $P_2O_0$ and the $Al_2O_3$ reaches 3.0 or more. In this case, accordingly, aqueous slurry mixed with the inventive negative electrode active material has pH that is excessively shifted to acidic side to make the slurry unstable. That is, it tends to generate gas. Therefore, when aluminum metaphosphate is used, this have to be combined with aluminum tertiary phosphate.

This step of attaching can be performed as follows, for example. The method that can be exemplified first is dry blending of negative electrode active material particles containing lithium inserted silicon compound particles and aluminum phosphorous composite oxide in the required amount with a mixer. As another method, the following wet blending method is exemplified. First, negative electrode active material particles containing lithium inserted silicon compound particles, aluminum phosphorous composite oxide in the required amount, and solvent (e.g., pure water in an amount of 1 to 10 times of the mass of the negative electrode active material particles) are mixed and stirred (e.g., stirred for 1 to 60 minutes). Subsequently, the obtained solvent is filtered through a Nutshe, and is subjected to vacuum drying (e.g., vacuum drying with heating at 50 to 150° C.). These methods (dry blending method, wet blending method) make it possible to attach aluminum phosphorous composite oxide onto the surfaces of the negative electrode active material particles so as to have a mass ratio of the $P_2O_5$ and the $Al_2O_3$ in the above range.

Incidentally, the mass ratio of $P_2O_5$ and $Al_2O_3$ in the aluminum phosphorous composite oxide can be measured by ICP-OES (inductively coupled plasma optical emission spectrometry) or ICP-MS (inductively coupled plasma mass spectrometry), for example. This mass ratio can also be calculated from the mass ratio of $P_2O_5$ and $Al_2O_3$ in the reagents used as raw materials ($Al(PO_3)_3$ and $AlPO_4$). The aluminum phosphates are available on the market with each mass ratio of $P_2O_5$ and $Al_2O_3$ being written in many cases, and the written mass ratio can be used as it is for calculation.

As the median diameter of the aluminum phosphorous composite oxide, it is possible to use a median diameter of aluminum phosphorous composite oxide before being attached to the negative electrode active material particle. When a purchased reagents ($Al(PO_3)_3$ and $AlPO_4$) are pulverized, the median diameter after pulverization is adopted. When the aluminum phosphorous composite oxide is attached onto the surface of the negative electrode active material particle, part of the aluminum phosphorous composite oxide is dissolved to react with the surface of the negative electrode active material particle, and actually, the median diameter after the attachment becomes smaller just a bit compared to that before being attached to the negative electrode active material particle. However, the change is in an extent that is hard to determine by observing slurry that contains attached negative electrode active material particles, which has been applied onto the surface of a negative electrode current collector, through scanning electron microscope-energy dispersive X-ray spectroscopy (SEM-EDX). Accordingly, the median diameter before the attachment can be uses as the median diameter after the attachment.

Subsequently, negative electrode active material particles having at least one peak in a region of a binding energy of more than 135 eV and 144 eV or less in a P 2p peak shape given in an X-ray photoelectron spectroscopy are selected from the negative electrode active material particles on which the aluminum phosphorous composite oxide is attached.

In this case, it is preferable to select negative electrode active material particles having at least one peak in a region of a binding energy of 65 eV or more and 85 eV or less in an Al 2p peak shape given in an X-ray photoelectron spectroscopy in addition to the peak described above. In this case, it is particularly preferable to select negative electrode active material particles having a peak at an energy position that is higher than the binding energy of 74 eV in an Al 2p peak shape given in an X-ray photoelectron spectroscopy.

Ordinary literatures describe the representative values of peak positions of aluminum phosphorous composite oxide species in a P 2p peak shape and an Al 2p peak shape as values of Al 74 eV and P 135 eV as well as Al 74 eV and P 134 eV. In the inventive method of producing a negative electrode active material, negative electrode active material particles are selected to have a peak at a position different from these described values (in a region of a binding energy of more than 135 eV and 144 eV or less in a P 2p peak shape). This makes it possible to produce a negative electrode active material that has more favorable slurry stability when it is mixed to aqueous slurry to further prevent generation of gas.

For example, aluminum tertiary phosphate and aluminum metaphosphate manufactured by Taihei Yogyou Yakuhin Co. Ltd. have representative values of peak position of Al 80.5 eV and P 140.5 eV in a P 2p peak shape and an Al 2p peak shape. Accordingly, the use of these as the aluminum phosphorous composite oxide facilitates to produce the inventive negative electrode active material. However, the inventive method of producing a negative electrode active material is not limited to the methods using thereof. Incidentally, the reason why these aluminum phosphates have peaks that are shifted from described values is not clear yet. That is, it has not become clear why the peak positions shift to Al 80.5 eV and so on. These aluminum phosphates can have structures different from those of aluminum phosphates in literatures. These aluminum phosphates occasionally have a peak at a position other than the above peak positions.

Incidentally, an X-ray photoelectron spectroscopy to measure a P 2p peak shape and an Al 2p peak shape can be performed with an X-ray photoelectron spectroscopy apparatus, using a monochromatic Al-Kα ray as an X-ray source with an X-ray spot diameter of 100 μm under Ar-ion sputtering gun conditions of 0.5 to 3.0 kV/2 mm×2 mm.

It is to be noted that the selection of negative electrode active material particles is not essentially performed in every production of the negative electrode active material. When once production conditions were found and adopted for giving negative electrode active material particles having at least one peak in a region of a binding energy of more than 135 eV and 144 eV or less in a P 2p peak shape, it is possible to produce the subsequent negative electrode active material under the same conditions as the adopted conditions.

The negative electrode active material produced as described above is mixed with other materials such as a negative electrode binder and a conductive assistant agent to form a negative-electrode mixture. Then, organic solvent or water is added thereto to form slurry. Subsequently, the slurry is applied onto the surface of a negative electrode current collector and dried to form a negative electrode active material layer. In this case, heat pressing and so on may be performed in accordance with needs. In the above manner, a negative electrode is successfully produced.

<Lithium-Ion Secondary Battery>

Then, a lithium-ion secondary battery containing the inventive negative electrode active material will be described. Here exemplifies a lithium-ion secondary battery of a laminate film type as a concrete example.

[Configuration of Lithium-Ion Secondary Battery of Laminate Film Type]

The laminate film lithium-ion secondary battery 30 shown in FIG. 4 mainly includes a wound electrode body 31 stored in sheet-shaped outer parts 35. This wound body is formed by winding a positive electrode, a negative electrode, and a separator disposed between these electrodes. There is also a case storing a laminate having a separator disposed between a positive electrode and a negative electrode. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the wound electrode body 31. The fusion-bond part may be, for example, a film such as a polyethylene or polypropylene film; the metallic layer may be aluminum foil, for example; the protecting layer may be nylon, for example.

The space between the outer parts 35 and the positive and negative electrode leads is filled with close adhesion films 34 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10 shown in FIG. 1, for example.

The positive electrode current collector is made of, for example, a conductive material such as aluminum.

The positive electrode active material layer contains any one kind or two kinds of positive electrode materials capable of occluding and emitting lithium ions, and may contain a binder, a conductive assistant agent, a dispersing agent, or other materials according to design. The same detailed description as described for the negative electrode binders and negative electrode conductive assistant agent, for example, is then given for the binder and the conductive assistant agent.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this compound is expressed by, for example, $Li_xM1O_2$ or $Li_yM2PO_4$, where M1 and M2 represent at least one kind of transition metal elements, and "x" and "y" represent a value varied depending on a charging or discharging status of a battery, which typically satisfy $0.05 \leq x \leq 1.10$ and $0.05 \leq y \leq 1.10$.

Examples of the complex oxide composed of lithium and a transition metal element include a lithium cobalt complex oxide ($Li_xCoO_2$) and a lithium nickel complex oxide ($Li_xNiO_2$). Examples of the phosphate compound containing lithium and a transition metal element include a lithium iron phosphate compound ($LiFePO_4$), a lithium iron manganese phosphate compound ($LiFe_{1-u}Mn_uPO_4$ ($0<u<1$)). This is because higher battery capacity and excellent cycle performance are obtained using these positive electrode materials.

[Negative Electrode]

The negative electrode is configured as in the above negative electrode 10 for a non-aqueous electrolyte secondary battery shown in FIG. 1, and, for example, has the negative electrode active material layers 12 disposed on both faces of the current collector 11. The negative electrode preferably has a negative-electrode charge capacity larger than electrical capacitance (a battery charge capacity) provided by the positive electrode active material, for this negative electrode itself can inhibit the precipitation of lithium metal.

The positive electrode active material layer is formed partially on both faces of the positive electrode current collector. The negative electrode active material layer is also formed partially on both faces of the negative electrode current collector. In this case, the negative electrode active material layer provided on the negative electrode current collector, for example, has a region which does not corresponds to a positive electrode active material layer to be faced. This intends to perform a stabilized battery design.

A non-facing area, that is, the above area at which the positive and negative electrode active material layers do not face one another is hardly affected by charging and discharging. The status of the negative electrode active material layer is consequently retained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolytic Solution]

A part of the active material layers or the separator is impregnated with a liquid electrolyte (an electrolytic solution). This electrolytic solution is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, and tetrahydrofuran. Among these, ethylene carbonate, propylene carbonate, dimethyl carbonate, diethyl carbonate, or ethylmethyl carbonate, or the combination thereof is preferable. Such solvent enables better performances. The combination of a viscous solvent, such as ethylene carbonate or propylene carbonate, and a non-viscous solvent, such as dimethyl carbonate, ethylmethyl carbonate, or diethyl carbonate allows much better performances, for such a solvent improves the dissociation of electrolyte salt and ionic mobility.

For an alloyed negative electrode, the solvent preferably contains at least one of halogenated chain carbonate ester and halogenated cyclic carbonate ester. Such a solvent enables the negative electrode active material to be coated with a stable coating at discharging and particularly charging. The halogenated chain carbonate ester is chain carbonate ester having halogen as a constitutive element (at least one hydrogen is substituted by halogen). And the halogenated cyclic carbonate ester is cyclic carbonate ester having halogen as a constitutive element (that is, at least one hydrogen is substituted by halogen).

The halogen is preferably, but not limited to, fluorine, for fluorine enables the formation of better coating than other halogens do. A larger number of halogens is better, for a more stable coating can be obtained which reduces a decomposition reaction of an electrolytic solution.

Examples of the halogenated chain carbonate ester include fluoromethyl methyl carbonate, difluoromethyl methyl carbonate. Examples of the halogenated cyclic carbonate ester include 4-fluoro-1,3-dioxolane-2-one, 4,5-difluoro-1,3-dioxolane-2-one.

The solvent preferably contains an unsaturated carbon bond cyclic carbonate as an additive, for this enables the formation of a stable coating on a negative electrode at charging and discharging and the inhibition of a decomposition reaction of the electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolytic solution. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent preferably ranges from 0.5 mol/kg or more and 2.5 mol/kg or less. This content enables high ionic conductivity.

[Method of Producing Laminate Film Secondary Battery]

The present invention makes it possible to produce a negative electrode using a negative electrode active material produced by the inventive method of producing a negative electrode active material described above, and to produce a lithium-ion secondary battery using the produced negative electrode.

Firstly, a positive electrode is produced with the above positive electrode material. A positive electrode mixture is created by mixing the positive electrode active material with as necessary the binder, the conductive assistant agent, and other materials, and dispersed in an organic solvent to form slurry of the positive-electrode mixture. The mixture slurry is then applied to a positive electrode current collector with a coating apparatus such as a die coater having a knife roll or a die head, and dried by hot air to obtain a positive electrode active material layer. The positive electrode active material layer is finally compressed with, for example, a roll press. In this case, heating may be performed, and the heating or the compression may be repeated multiple times.

Secondly, a negative electrode active material layer is formed on a negative electrode current collector to produce a negative electrode through the same procedure as in the above production of the negative electrode 10 for the non-aqueous electrolyte secondary battery in FIG. 1.

In producing the positive electrode and the negative electrode, the active material layers are formed on both faces of the positive and negative electrode current collector. In both the electrodes, the length of these active material layers formed on the faces may differ from one another (See FIG. 1).

Then, an electrolytic solution is prepared. With ultrasonic welding, the positive electrode lead 32 is attached to the positive electrode current collector and the negative-electrode lead 33 is attached to the negative electrode current collector as shown in FIG. 4. The positive and negative electrodes and the separator interposed therebetween are stacked or wound to produce the wound electrode body 31 and a protecting tape is stuck to the outermost circumference of the body. The electrode body is flattened. The film-shaped outer part 35 is folded in half to interpose the electrode body therebetween. The insulating portions of the outer part are stuck to one another by heat sealing, thereby the wound electrode body is encapsulated with one direction is released. The close adhesion films are inserted between the outer part and the positive and negative electrode leads. The prepared electrolytic solution is introduced from the open side in a prescribed amount to perform the impregnation of the electrolytic solution under a vacuum. The open side is stuck by vacuum heat sealing. In this manner, the laminate film lithium-ion secondary battery 30 is successfully produced.

EXAMPLES

The present invention will be more specifically described below with reference to Examples of the present invention and Comparative Examples, but the present invention is not limited to these Examples.

Example 1-1

The laminate film lithium-ion secondary battery 30 shown in FIG. 4 was produced by the following procedure.

The procedure began with the production of a positive electrode. A positive-electrode mixture was prepared by mixing 95 mass % of $LiNi_{0.7}Co_{0.25}Al_{0.05}O$ of lithium-nickel-cobalt complex oxide (lithium-nickel-cobalt-aluminum complex oxide: NCA) as a positive electrode active material, 2.5 mass % of a positive electrode conductive assistant agent, and 2.5 mass % of a positive electrode binder (polyvinylidene fluoride: PVDF). The positive-electrode mixture was dispersed in an organic solvent (N-methyl-2-pyrrolidone, NMP) to form paste slurry. The slurry was applied to both surfaces of a positive electrode current collector with a coating apparatus having a die head and dried with a drying apparatus of hot-air type. The positive electrode current collector used herein had a thickness of 15 μm. The resultant was finally compressed with a roll press.

Next, a negative electrode was produced. In the beginning, a negative electrode active material was produced by the following procedure. A mixed raw material of metallic silicon and silicon dioxide was introduced into a reaction furnace and evaporated under a vacuum atmosphere of 10 Pa to deposit the evaporated material on an adsorption plate. The deposit was sufficiently cooled and then taken out to pulverize the deposit with a ball mill. In thus obtained silicon compound particle, the value of "x" in $SiO_x$ was 0.3. The silicon compound particles were classified to adjust the particle sizes. Then, thermal decomposition CVD was performed to coat the silicon compound particles with carbon material.

Subsequently, the silicon compound particles were modified by inserting lithium by thermal doping method. First, LiH powder and the silicon compound particles were sufficiently mixed in an Ar atmosphere, followed by sealing and homogenizing by stirring the whole sealed container. Then, they were modified by heating in a range of 700° C. to 750° C. To extract partial active Li from the silicon compound, the heated silicon compound particles were sufficiently cooled, and then washed with alcohol. By the treatment described above, negative electrode active material particles were produced.

Then, the negative electrode active material particles containing the lithium inserted silicon compound particles, aluminum phosphorous composite oxide, and a solvent were mixed and stirred for 30 minutes. As the solvent, pure water was used, and the amount of added pure water was 5 times amount of the negative electrode active material particles. The aluminum phosphorous composite oxide used in this case was a mixture of pulverized aluminum tertiary phosphate (taiporee L2, manufactured by Taihei Yogyou Yakuhin Co. Ltd.) and pulverized aluminum metaphosphate (manufactured by Taihei Yogyou Yakuhin Co. Ltd.). The aluminum tertiary phosphate ($AlPO_4$) used here contained 55.46% of $P_2O_5$ and 44.54% of $Al_2O_3$. The aluminum metaphosphate ($Al(PO_3)_3$) used here contained 77.82% of $P_2O_5$ and 22.18% of $Al_2O_3$. This aluminum phosphorous composite oxide had a median diameter of 0.8 μm. The amount of added aluminum phosphorous composite oxide was 1.5 mass % relative to the negative electrode active material particles. In the 1.5 mass %, the portion of 1 mass % was aluminum tertiary phosphate, and the portion of 0.5 mass % was aluminum metaphosphate. Accordingly, the mass ratio of $P_2O_5$ and $Al_2O_3$ was 1.70. Incidentally, this mass ratio was calculated as follows.

$$P_2O_5/Al_2O_3=(1)/(2)$$

$$P_2O_5(\text{mass \%})=AlPO_4(\text{mass \%})\times55.46+Al(PO_3)_3 \\ (\text{mass \%})\times77.82 \quad (1)$$

$$Al_2O_3(\text{mass \%})=AlPO_4(\text{mass \%})\times44.54+Al(PO_3)_3 \\ (\text{mass \%})\times22.18 \quad (2)$$

After stirring, the obtained solution was filtered through a Nutshe, and dried in vacuum at 100° C. In this manner, aluminum phosphorous composite oxide was attached onto the surfaces of the negative electrode active material particles so as to have a mass ratio of $P_2O_5$ and $Al_2O_3$ of 1.70. Thus obtained negative electrode active material particle on which aluminum phosphorous composite oxide was attached had a peak of binding energy at 140.5 eV in a P 2p peak shape (P 140.5 eV) given in an X-ray photoelectron spectroscopy. This negative electrode active material particle also had a peak of binding energy at 80.5 eV in an Al 2p peak shape (Al 80.5 eV).

The negative electrode active material particles and a carbon-based active material were blended in a mass ratio of 1:9 to produce a negative electrode active material. The carbon-based active material used herein was a mixture in which artificial graphite and natural graphite coated with a pitch layer was mixed in a mass ratio of 5:5. The carbon-based active material had a median diameter of 20 μm.

Then, the produced negative electrode active material, conductive assistant agent-1 (carbon nanotube, CNT), conductive assistant agent-2 (carbon fine particle with a median diameter of about 50 nm), styrene-butadiene rubber (styrene-butadiene copolymer; hereinafter, referred to as SBR), and carboxymethyl cellulose (hereinafter, referred to as CMC) were mixed in a dry mass ratio of 92.5:1:1:2.5:3. This was diluted with pure water to form negative-electrode mixture slurry. Incidentally, the foregoing SBR and CMC were negative electrode binders (negative electrode binding agents). This negative-electrode mixture slurry had pH of 10.7.

As the negative electrode current collector, an electrolytic copper foil with a thickness of 15 μm was used. This electrolytic copper foil contained each 70 ppm by mass of carbon and sulfur. Finally, the negative electrode mixture slurry was applied onto the negative electrode current collector, and subjected to drying at 100° C. for 1 hour under a vacuum. The negative electrode active material layer was deposited in a deposited amount per unit area on a face of the negative electrode after drying (referred to as an area density) of 5 mg/cm².

Subsequently, solvents (4-fluoro-1,3-dioxolane-2-one (FEC), ethylene carbonate (EC), and dimethyl carbonate (DMC)) were mixed, followed by dissolving electrolyte salt (lithium hexafluorophosphate ($LiPF_6$)) to prepare an electrolytic solution. In this case, the solvent composition was set to FEC:EC:DMC=10:20:70 in a volume ratio, and the content of the electrolyte salt was set to 1 mol/kg based on the solvent.

Then, a secondary battery was assembled as follows. First, an aluminum lead was attached to one end of the positive electrode current collector with ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding was fixed with a PET protecting tape. The separator used herein was a laminate film (thickness: 12 μm) in which a film mainly composed of porous polyethylene was sandwiched by films mainly composed of porous polypropylene. Then, the electrode body was put between outer parts, and then peripheries excluding one side are hot melted, and thereby the electrode body was stored in the outer parts. The outer part was an aluminum laminate film in which a nylon film, an aluminum foil, and a polypropylene film were laminated. Then, the electrolytic solution was introduced from the open side to perform the impregnation under a vacuum. The open side was then stuck by heat sealing.

On the secondary battery thus produced, the cycle performance and the initial charge and discharge performance were evaluated.

The cycle performance was investigated in the following manner: First, two cycles of charging and discharging were performed at 0.2 C under an atmosphere of 25° C. to stabilize the battery and the discharge capacity in the second cycle was measured. Next, the cycle of charging and discharging was repeated until the total number of cycles reached 499 cycles and the discharge capacity was measured every cycle. Finally, a capacity retention rate (hereinafter, referred to as a retention rate simply) was calculated by dividing the discharge capacity in the 500-th cycle, which was obtained by charging and discharging at 0.2 C, by the discharge capacity in the second cycle. In the normal cycle, that is, in the cycles from the third cycle to 499-th cycle, the charging and discharging was performed at 0.7 C in charging and 0.5 C at discharging.

To investigate the initial charge and discharge performance, a first efficiency (hereinafter, also referred to as an initial efficiency) was calculated. The first efficiency was calculated from the expression shown by First Efficiency (%)=(First Discharge Capacity/First Charge Capacity)×100. The atmosphere temperate was the same as the cycle performance was investigated.

Examples 1-2 to 1-5

A secondary battery was produced as in Example 1-1 except for adjusting the oxygen amount in the bulk of the silicon compound. In this case, the oxygen amount was adjusted by changing the ratio of metallic silicon and silicon oxide in the raw material of silicon compound or heating temperature. Each "x" value of the silicon compound shown by $SiO_x$ in Examples 1-1 to 1-5 is shown in Table 1.

In this case, the negative electrode active material particles in Examples 1-1 to 1-5 had properties as described below. In the interior of silicon compound particles in the negative electrode active material particles, $Li_2SiO_3$ and $Li_2Si_2O_5$ were contained. The silicon compound had a diffraction peak attributable to Si(111) crystal face in an X-ray diffraction, the half value width (2θ) of which was 2.257°, and the crystallite corresponding to the Si(111) crystal face with the size being 3.77 nm.

In each of the Examples described above, the $^{29}$Si-MAS-NMR spectrum exhibited a peak attributable to Si and Li silicate region given in the chemical shift value of −60 to −95 ppm. In each of the Examples described above, the $^{29}$Si-MAS-NMR spectrum exhibited a peak attributable to $SiO_2$-region given in the chemical shift value of −95 to −150 ppm. In each of the Examples described above, the $^{29}$Si-MAS-NMR spectrum exhibited a relationship of A>B where A is a maximum peak intensity derived from Si and Li silicate region given in the chemical shift value of −60 to −95 ppm, and B is a peak intensity derived from $SiO_2$-region given in the chemical shift value of −96 to −150 ppm.

The average thickness of the carbon material contained in the negative electrode active material particle was 100 nm. The median diameter $D_{50}$ of the negative electrode active material particle was 4.0 μm.

The negative electrode prepared as described above was used for producing a test cell in a coin battery shape with a size of 2032 together with a lithium counter electrode, and the discharging behavior was evaluated. More specifically, the test cell was charged at first with a constant current and constant voltage until the voltage reached 0 V on the basis of the Li counter electrode, and the charging was stopped at the current density reached 0.05 mA/cm². The test cell was then discharged with a constant current until the voltage reached 1.2 V. At this time, the current density was 0.2 mA/cm². This charging and discharging were repeated 30 times. The data obtained by the foregoing charging and discharging were plotted on a graph of capacity change (dQ/dV) as the ordinate and the voltage (V) as the abscissa to determine whether a peak was obtained or not at the V in a range of 0.4 to 0.55 (V). As the result, the above peak was not obtained in Example 1-1, in which "x" of $SiO_x$ was less than 0.5. In other Examples, the above peak was obtained within 30 times of charging and discharging, and this peak was obtained in every charging and discharging from the charging and discharging in which the peak had initially appeared to the 30$^{th}$ charging and discharging.

Table 1 shows evaluation results of Examples 1-1 to 1-5.

TABLE 1

SiOx $D_{50}$ = 4 μm, Graphite (natural graphite:artificial graphite = 5:5) $D_{50}$ = 20 μm, SiOx ratio 10 mass %, $Li_2SiO_3$, $Li_2Si_2O_5$, carbon material average thickness 100 nm, half value width 2.257°, crystallite 3.77 nm, modification method: thermal doping, A > B, aluminum phosphorous composite oxide $D_{50}$ = 0.8 μm, total amount of aluminum phosphorous composite oxide 1.50 mass %, $P_2O_5/Al_2O_3$ (mass ratio) 1.70, Al 2 p 80.5 eV, P 2 p 140.5 eV

|  | x | Capacity retention rate (%) | Initial efficiency (%) | Times till gas generation |
|---|---|---|---|---|
| Example 1-1 | 0.3 | 45.0 | 87.8 | 80 hours |
| Example 1-2 | 0.5 | 80.9 | 86.7 | 100 hours |
| Example 1-3 | 1 | 81.0 | 86.7 | 120 hours |
| Example 1-4 | 1.6 | 80.8 | 86.5 | 120 hours |
| Example 1-5 | 1.8 | 75.2 | 85.8 | 120 hours |

As shown in Table 1, when the oxygen amount was increased, i.e., 0.5≤x, the capacity retention rate was increased. It can be assumed that when 0.5≤x, particularly 1≤x, the ratio of Li silicate became sufficient in Li doping to stabilize the bulk, and gas generation hardly proceeded in the slurry. When x≤1.6, the resistance of the silicon oxide was not too high, the battery was easily evaluated, and the capacity retention rate was favorable.

Examples 2-1 to 2-3

A secondary battery was produced under the same conditions as in Example 1-3 except for changing the kind of lithium silicate contained in the interior of the silicon compound particle as shown in Table 2, and the cycle performance and first efficiency were evaluated. Incidentally, in Example 2-2, the kind of lithium silicate contained in the interior of the silicon compound particle was changed as described in Table 2 by changing the modification method to an oxidation and reduction method.

That is, in Example 2-2, the silicon compound particle coated with carbon material was modified by oxidation and reduction method to insert lithium. In this case, the negative electrode active material particles containing silicon compound particles were firstly immersed into a solution (solution-A) in which lithium pieces and naphthalene of aromatic compound had been dissolved into tetrahydrofuran (hereinafter referred to as THF). This solution-A was prepared by dissolving naphthalene into THF solvent in a concentration of 0.2 mol/L, followed by adding the lithium pieces in an amount of 10 mass % relative to the mixed solution of THF and naphthalene. When the negative electrode active material particles were immersed, the temperature of the solution was set to 20° C., and the time for immersion was set to 20 hours. Subsequently, the negative electrode active material particles were filtered off. By the treatments described above, lithium was inserted into the negative electrode active material particles.

Then, the negative electrode active material particles were washed, and the washed negative electrode active material particles were heat treated in an Ar atmosphere. At this time, the heat treatment was performed at 600° C. The heat treatment time was set to 3 hours. By the treatments described above, crystalline $Li_4SiO_4$ was formed in the silicon compound particles.

Then, the negative electrode active material particles were washed, and the washed negative electrode active material particles were dried under reduced pressure. In this manner, the negative electrode active material particles were modified.

Comparative Example 2-1

A secondary battery was produced under the same conditions as in Example 1-3 except that lithium was not inserted into the silicon compound particles, and the cycle performance and first efficiency were evaluated.

Table 2 shows the results of Examples 2-1 to 2-3 and Comparative Example 2-1.

TABLE 2

SiOx x = 1 $D_{50}$ = 4 μm, Graphite (natural graphite:artificial graphite = 5:5) $D_{50}$ = 20 μm, SiOx ratio 10 mass %, carbon material average thickness 100 nm, dQ/dV exists, aluminum phosphorous composite oxide $D_{50}$ = 0.8 μm, total amount of aluminum phosphorous composite oxide 1.50 mass %, $P_2O_5/Al_2O_3$ (mass ratio) 1.70, Al 2 p 80.5 eV, P 2 p 140.5 eV

| | Lithium silicate | Capacity retention rate (%) | Initial efficiency (%) | Times till gas generation |
|---|---|---|---|---|
| Example 2-1 | $Li_2SiO_3$ | 80.3 | 86.2 | 120 hours |
| Example 2-2 | $Li_4SiO_4$ | 82.1 | 86.4 | 72 hours |
| Example 2-3 | $Li_2Si_2O_5$ | 80 | 86.1 | 120 hours |
| Example 1-3 | $Li_2SiO_3$, $Li_2Si_2O_5$ | 81.2 | 86.8 | 120 hours |
| Comparative Example 2-1 | — | 76.5 | 80.5 | 120 hours |

When the silicon compound contained stable lithium silicate such as $Li_2SiO_3$, $Li_4SiO_4$, and $Li_2Si_2O_5$, the capacity retention rate and initial efficiency were improved. Particularly, when both lithium silicates of $Li_2SiO_3$ and $Li_2Si_2O_5$, the capacity retention rate and initial efficiency were more improved. On the other hand, Comparative Example 2-1, in which modification was not performed and lithium was not contained in the silicon compound, caused lowering of capacity retention rate and initial efficiency compared to Examples 2-1, 2-2, 2-3, and 1-3.

Examples 3-1 to 3-4

A secondary battery was produced under the same conditions as in Example 1-3 except for changing the average thickness of the carbon material that coated the surface of the silicon compound particle as shown in Table 3, and the cycle performance and first efficiency were evaluated. The average thickness of the carbon material can be adjusted by changing the CVD conditions.

Example 3-5

A secondary battery was produced under the same conditions as in Example 1-3 except that the surface of the silicon compound particle was not coated with a carbon material, and the cycle performance and first efficiency were evaluated.

TABLE 3

SiOx x = 1 $D_{50}$ = 4 μm, Graphite (natural graphite:artificial graphite = 5:5) $D_{50}$ = 20 μm, SiOx ratio 10 mass %, $Li_2SiO_3$, $Li_2Si_2O_5$, dQ/dV exists, half value width 2.257°, crystallite 3.77 nm, modification method: thermal doping, A > B, aluminum phosphorous composite oxide $D_{50}$ = 0.8 μm, total amount of aluminum phosphorous composite oxide 1.50 mass %, $P_2O_5/Al_2O_3$ (mass ratio) 1.70, Al 2 p 80.5 eV, P 2 p 140.5 eV

| | Carbon material | Average thickness (nm) | Capacity retention rate (%) | Initial efficiency (%) | Times till gas generation |
|---|---|---|---|---|---|
| Example 3-1 | Exist | 5 | 79.3 | 86.6 | 120 hours |
| Example 3-2 | Exist | 10 | 80.9 | 86.9 | 120 hours |
| Example 1-3 | Exist | 100 | 81.0 | 86.7 | 120 hours |
| Example 3-3 | Exist | 1000 | 80.8 | 87.1 | 120 hours |
| Example 3-4 | Exist | 5000 | 80.3 | 87.1 | 120 hours |
| Example 3-5 | None | — | 78.1 | 85.2 | 120 hours |

As can be seen from Table 3, more favorable capacity retention rate and initial efficiency were obtained with the carbon material coating compared to Example 3-5 without carbon material coating. When the average thickness of the carbon material was 5 nm or more, the electric conductivity was particularly improved, and the capacity retention rate and the initial efficiency were successfully improved. When the average thickness of the carbon material was 5000 nm or less on the other hand, allowing the battery design to sufficiently secure the amount of the silicon compound particles, the battery capacity was not lowered thereby.

Examples 4-1, 4-2

A secondary battery was produced under the same conditions as in Example 1-3 except for changing the peak positions in a P 2p peak shape and Al 2p peak shape as shown in Table 4, and the cycle performance and first efficiency were evaluated.

Comparative Example 4-1

A secondary battery was produced under the same conditions as in Example 1-3 except that aluminum phosphorous composite oxide was not attached, and the cycle performance and first efficiency were evaluated.

TABLE 4

| Table 4 | P 2p peak | Al 2p peak | Positions of P 2p, Al 2p peaks (eV) | Capacity retention rate (%) | Initial efficiency (%) | Times till gas generation |
|---|---|---|---|---|---|---|
| Comparative Example 4-1 | None | None | None | 74.0 | 86.7 | 6 hours |
| Example 1-3 | Exist | Exist | Al 2p 75.5, 80.5 P 2p 125.5, 140.5 | 81.0 | 86.7 | 120 hours |
| Example 4-1 | Exist | Exist | Al 2p 74, 80.5 P 2p 135, 140.5 | 80.9 | 86.5 | 120 hours |
| Example 4-2 | Exist | Exist | Al 2p 74, 80.5 P 2p 134, 140.5 | 80.8 | 86.6 | 120 hours |

SiOx x = 1 $D_{50}$ = 4 μm, Graphite (natural graphite: artificial graphite = 5:5) $D_{50}$ = 20 μm, SiOx ratio 10 mass %, $Li_2SiO_3$, $Li_2Si_2O_5$, carbon material average thickness 100 nm, dQ/dV exists, half value width 2.257°, crystallite 3.77 nm, modification method: thermal doping, A > B As can be seen from Table 4, when aluminum phosphorous composite oxide was not attached (Comparative Example 4-1), generation of gas could not be prevented. On the other hand, when aluminum phosphorous composite oxide was attached (Examples 1-3, 4-1, and 4-2), generation of gas was successfully prevented. This is probably due to improved water resistance of the negative electrode active material, which improved the stability of aqueous slurry mixed with the negative electrode active material. FIG. 7 shows a P 2p peak shape measured in Example 1-3 of the present invention. FIG. 8 shows an Al 2p peak shape measured in Example 1-3 of the present invention. As shown in FIGS. 7 and 8, negative electrode active material in Example 1-3 had peaks at positions (Al 80.5 eV, P 140.5 eV) other than the commonly described values (Al 74 eV, P 135 eV and Al 74 eV, P 134 eV) in a P 2p peak shape and an Al 2p peak shape. Accordingly when such a negative electrode active material was mixed into aqueous slurry, the slurry stability became more favorable, and generation of gas was prevented further. Incidentally, the peak of P 125.5 eV in FIG. 7 is due to ordinal phosphorous oxide.

Examples 5-1 to 5-5, Comparative Example 5-1

A secondary battery was produced under the same conditions as in Example 1-3 except for changing the mixing ratio of aluminum tertiary phosphate and aluminum metaphosphate (i.e., mass ratio of $P_2O_5$ and $Al_2O_3$) and the amount of added aluminum phosphorous composite oxide relative to the negative electrode active material particles as shown in Table 5, and the cycle performance and first efficiency were evaluated. In this case, the pH of the obtained slurry was changed as shown in Table 5.

As shown in Table 5, when aluminum tertiary phosphate was solely used as the aluminum phosphorous composite oxide (Example 5-5), aqueous slurry mixed with the inventive negative electrode active material had pH at alkaline side (pH of 11 or more), which made the slurry somewhat unstable but was in a permissible lower margin. On the other hand, when aluminum metaphosphate was solely used as the aluminum phosphorous composite oxide (Comparative Example 5-1), the mass ratio of $P_2O_5$ and the $Al_2O_3$ reaches 3.0 or more. In this case, accordingly, aqueous slurry mixed with the inventive negative electrode active material had pH that was excessively shifted to acidic side to make the slurry unstable. That is, it tended to generate gas. Therefore, when aluminum metaphosphate is used, this have to be combined with aluminum tertiary phosphate. The most favorable results were obtained when 1.5 mass % of aluminum phosphorous composite oxide was added relative to the negative electrode active material particle, and 0.5 mass % of aluminum metaphosphate was added relative to 1 mass % of aluminum tertiary phosphate ($P_2O_5/Al_2O_3$ (mass ratio)=1.70) (Example 1-3).

Examples 6-1 to 6-5

A secondary battery was produced under the same conditions as in Example 1-3 except for changing the median diameter of aluminum phosphorous composite oxide as shown in Table 6, and the cycle performance and first efficiency were evaluated.

Example 6-6

A secondary battery was produced under the same conditions as in Example 6-3 except for changing the method of

TABLE 5

| Table 5 | $AlPO_4$ (mass %) | $Al(PO_3)_3$ (mass %) | $P_2O_5/Al_2O_3$ (mass ratio) | Total amount of aluminum phosphorous composite oxide (mass %) | Capacity retention rate (%) | Initial efficiency (%) | Times till gas generation |
|---|---|---|---|---|---|---|---|
| Comparative Example 5-1 | 0 | 1.00 | 3.51 | 1.00 | 74.5 | 85.0 | 6 hours |
| Example 5-1 | $5.00 \times 10^{-1}$ | 1.00 | 2.37 | 1.50 | 79.5 | 85.2 | 120 hours |
| Example 5-2 | 1.00 | 1.00 | 2.00 | 2.00 | 80.4 | 86.0 | 120 hours |
| Example 1-3 | 1.00 | $5.00 \times 10^{-1}$ | 1.70 | 1.50 | 81.0 | 86.7 | 120 hours |
| Example 5-3 | 2.00 | $5.00 \times 10^{-1}$ | 1.50 | 2.50 | 80.5 | 86.1 | 120 hours |
| Example 5-4 | 4.00 | $5.00 \times 10^{-1}$ | 1.38 | 4.50 | 80.0 | 85.5 | 120 hours |
| Example 5-5 | 1.00 | 0 | 1.25 | 1.00 | 78.0 | 85.1 | 120 hours |

SiOx x = 1 $D_{50}$ = 4 μm, Graphite (natural graphite: artificial graphite = 5:5) $D_{50}$ = 20 μm, SiOx ratio 10 mass %, $Li_2SiO_3$, $Li_2Si_2O_5$, carbon material average thickness 100 nm, dQ/dV exists, half value width 2.257°, crystallite 3.77 nm, modification method: thermal doping, A > B, aluminum phosphorous composite oxide $D_{50}$ = 0.8 μm, Al 2p 80.5 eV, P 2p 140.5 eV attaching aluminum phosphorous composite oxide on the surface of the negative electrode active material particles from wet blending to dry blending, and the cycle performance and first efficiency were evaluated. Specifically, aluminum phosphorous composite oxide was pulverized, and the pulverized powder was added in an amount of 1.5 mass % relative to the negative electrode active material particles. In this case, the material (negative electrode active material particles having aluminum phosphorous composite oxide attached thereto) was produced by mixing the pulverized powder and negative electrode active material particles with a mixer.

Example 6-7

A secondary battery was produced under the same conditions as in Example 6-2 except for changing the method of attaching aluminum phosphorous composite oxide on the surface of the negative electrode active material particles from wet blending to dry blending, and the cycle performance and first efficiency were evaluated. Specifically, aluminum phosphorous composite oxide was pulverized, and the pulverized powder was added in an amount of 1.5 mass % relative to the negative electrode active material particles. In this case, the material (negative electrode active material particles having the aluminum phosphorous composite oxide attached thereto) was produced by mixing the pulverized powder and negative electrode active material particles with a mixer.

TABLE 6

SiOx x = 1 $D_{50}$ = 4 μm, Graphite (natural graphite:artificial graphite = 5:5) $D_{50}$ = 20 μm, SiOx ratio 10 mass %, $Li_2SiO_3$, $Li_2Si_2O_5$, carbon material average thickness 100 nm, dQ/dV exists, half value width 2.257°, crystallite 3.77 nm, modification method: thermal doping, A > B, total amount of aluminum phosphorous composite oxide 1.50 mass %, $P_2O_5/Al_2O_3$ (mass ratio) 1.70, Al 2 p 80.5 eV, P 2 p 140.5 eV

| | Median diameter of aluminum phosphorous composite oxide (μm) | Capacity retention rate (%) | Initial efficiency (%) | Times till gas generation |
|---|---|---|---|---|
| Example 6-1 | 0.5 | 81.1 | 86.8 | 120 hours |
| Example 1-3 | 0.8 | 81.0 | 86.7 | 120 hours |
| Example 6-2 | 1.2 | 80.8 | 86.6 | 120 hours |
| Example 6-3 | 3 | 80.5 | 86.4 | 120 hours |
| Example 6-4 | 5.5 | 80.3 | 85.2 | 120 hours |
| Example 6-5 | 7 | 80.1 | 85.1 | 120 hours |
| Example 6-6 | 3 | 81.0 | 86.8 | 120 hours |
| Example 6-7 | 1.2 | 81.2 | 87.0 | 120 hours |

As shown in Table 6, aluminum phosphorous composite oxide preferably has a median diameter of 5.5 μm or less (Examples 6-1 to 6-4). As the median diameter is smaller, the specific area of aluminum phosphorous composite oxide becomes larger, and the effect of the present invention (slurry stability, etc.) is exhibited easily. With the relatively small median diameter, the aluminum phosphorous composite oxide like this hardly acts as a foreign substance. Accordingly, there rarely occurs a situation that the aluminum phosphorous composite oxide like this enters to an electrode as a foreign substance to separate out Li on the electrode.

Examples 7-1 to 7-9

A secondary battery was produced under the same conditions as in Example 1-3 except for changing the crystallinity of silicon in the silicon compound particles as shown in Table 7, and the cycle performance and first efficiency were evaluated. It is to be noted that the crystallinity of silicon in the silicon compound particles can be controlled by changing the vaporization temperature of the raw materials or heat treatment of the produced silicon compound particles. In Example 7-9, the half value width is calculated as 200 or more, but this is a result from fitting using an analytical software, and a peak was not obtained actually. Accordingly, the silicon compound in Example 7-9 is considered as an amorphous substantially.

TABLE 7

SiOx x = 1 $D_{50}$ = 4 μm, Graphite (natural graphite:artificial graphite = 5:5) $D_{50}$ = 20 μm, SiOx ratio 10 mass %, $Li_2SiO_3$, $Li_2Si_2O_5$, carbon material average thickness 100 nm, dQ/dV exists, modification method: thermal doping, A > B, aluminum phosphorous composite oxide $D_{50}$ = 0.8 μm, total amount of aluminum phosphorous composite oxide 1.50 mass %, $P_2O_5/Al_2O_3$ (mass ratio) 1.70, Al 2 p 80.5 eV, P 2 p 140.5 eV

| | half value width (°) | Si(111) crystallite size (nm) | Capacity retention rate (%) | Initial efficiency (%) | Times till gas generation |
|---|---|---|---|---|---|
| Example 7-1 | 0.756 | 11.42 | 79.5 | 87.1 | 120 hours |
| Example 7-2 | 0.796 | 10.84 | 79.8 | 86.9 | 120 hours |
| Example 7-3 | 1.025 | 8.55 | 80.3 | 87.0 | 120 hours |
| Example 7-4 | 1.218 | 7.21 | 80.4 | 87.0 | 120 hours |
| Example 7-5 | 1.271 | 6.63 | 80.6 | 87.1 | 120 hours |
| Example 7-6 | 1.845 | 4.62 | 80.8 | 86.9 | 120 hours |
| Example 1-3 | 2.257 | 3.77 | 81.0 | 86.7 | 120 hours |
| Example 7-7 | 2.593 | 3.29 | 82.5 | 86.9 | 120 hours |
| Example 7-8 | 10.123 | 1.524 | 83.0 | 87.0 | 120 hours |
| Example 7-9 | 20.221 | 0 | 83.3 | 86.9 | 120 hours |

Higher capacity retention rates were obtained particularly when the half value width was 1.2° or more and the size of the crystallite corresponding to Si(111) face was 7.5 nm or less. Among them, most favorable properties were obtained when the silicon compound was amorphous.

Example 8-1

A secondary battery was produced under the same conditions as in Example 1-3 except for using a silicon compound in which the relation between maximum peak intensity A derived from Si and Li silicate region and the peak intensity B derived from $SiO_2$-region was A<B, and the cycle performance and first efficiency were evaluated. In this case, the amount of $Li_2SiO_3$ was reduced by reducing the amount of inserted lithium in modification to decrease the peak intensity A due to $Li_2SiO_3$.

TABLE 8

SiOx x = 1 $D_{50}$ = 4 μm, Graphite (natural graphite:artificial graphite = 5:5) $D_{50}$ = 20 μm, SiOx ratio 10 mass %, $Li_2SiO_3$, $Li_2Si_2O_5$, carbon material average thickness 100 nm, dQ/dV exists, half value width 2.257°, crystallite 3.77 nm, modification method: thermal doping, aluminum phosphorous composite oxide $D_{50}$ = 0.8 μm, total amount of aluminum phosphorous composite oxide 1.50 mass %, $P_2O_5/Al_2O_3$ (mass ratio) 1.70, Al 2 p 80.5 eV, P 2 p 140.5 eV

| | A, B | Capacity retention rate (%) | Initial efficiency (%) | Times till gas generation |
|---|---|---|---|---|
| Example 8-1 | A < B | 80.0 | 85.9 | 120 hours |
| Example 1-3 | A > B | 81.0 | 86.7 | 120 hours |

As can be seen from Table 8, the battery capacity was more improved when the relation between peak intensities was A>B.

Example 9-1

A secondary battery was produced under the same conditions as in Example 1-3 except for using a negative electrode active material in which the test cell did not exhibit a peak of V in a range of 0.40 V to 0.55 V in any charging and discharging in a V–dQ/dV curve obtained by charging and discharging for 30 times, and the cycle performance and first efficiency were evaluated.

TABLE 9

SiOx x = 1 $D_{50}$ = 4 μm, Graphite (natural graphite:artificial graphite = 5:5) $D_{50}$ = 20 μm, SiOx ratio 10 mass %, $Li_2SiO_3$, $Li_2Si_2O_5$, carbon material average thickness 100 nm, half value width 2.257°, crystallite 3.77 nm, modification method: thermal doping, A > B, aluminum phosphorous composite oxide $D_{50}$ = 0.8 μm, total amount of aluminum phosphorous composite oxide 1.50 mass %, $P_2O_5/Al_2O_3$ (mass ratio) 1.70, Al 2 p 80.5 eV, P 2 p 140.5 eV

|  | dQ/dV peak | Capacity retention rate (%) | Initial efficiency (%) | Times till gas generation |
|---|---|---|---|---|
| Example 9-1 | None | 80.0 | 86.3 | 120 hours |
| Example 1-3 | Exist | 81.0 | 86.7 | 120 hours |

For sharp rising of a discharge curve, the silicon compound (SiOx) has to exhibit the same discharging behavior as that of silicon (Si). A silicon compound with which a peak did not shown in the range in 30 times of charging and discharging exhibited a relatively moderate discharge curve, causing to form a secondary battery in which the initial efficiency was slightly lowered. In case of exhibiting a peak within 30 times of charging and discharging, a stable bulk was formed, and the capacity retention rate and the initial efficiency were improved.

Examples 10-1 to 10-6

A secondary battery was produced under the same conditions as in Example 1-3 except for changing the median diameter of negative electrode active material particles as shown in Table 10, and the cycle performance and first efficiency were evaluated.

TABLE 10

SiOx x = 1, Graphite (natural graphite:artificial graphite = 5:5) $D_{50}$ = 20 μm, SiOx ratio 10 mass %, $Li_2SiO_3$, $Li_2Si_2O_5$, carbon material average thickness 100 nm, dQ/dV exists, half value width 2.257°, crystallite 3.77 nm, modification method: thermal doping, A > B, aluminum phosphorous composite oxide $D_{50}$ = 0.8 μm, total amount of aluminum phosphorous composite oxide 1.50 mass %, $P_2O_5/Al_2O_3$ (mass ratio) 1.70, Al 2 p 80.5 eV, P 2 p 140.5 eV

|  | Median diameter of negative electrode active material particles (μm) | Capacity retention rate (%) | Initial efficiency (%) | Times till gas generation |
|---|---|---|---|---|
| Example 10-1 | 0.1 | 79.9 | 86.6 | 100 hours |
| Example 10-2 | 0.5 | 80.6 | 86.7 | 120 hours |
| Example 10-3 | 1 | 81.5 | 86.8 | 120 hours |
| Example 1-3 | 4 | 81.0 | 86.7 | 120 hours |
| Example 10-4 | 10 | 81.5 | 87.1 | 120 hours |
| Example 10-5 | 15 | 81.3 | 87.1 | 120 hours |
| Example 10-6 | 20 | 79.6 | 86.8 | 120 hours |

When the median diameter of negative electrode active material particles was 0.5 μm or more, the retention rate was improved. This is probably due to the negative electrode active material particles with the surface area per mass being not too large, which successfully reduced the area on which side reaction occurred. On the other hand, when the negative electrode active material particles had a median diameter of 15 μm or less, the loss of reversible Li was successfully prevented because of difficulty in particle breakage to hardly form a solid electrolyte interface (SEI) due to the new surface in charging and discharging. When the negative electrode active material particles has a median diameter of 15 μm or less, the negative electrode active material particles do not expand largely, making it possible to prevent the negative electrode active material layer from physical and electrical breakage due to expansion.

Example 11-1

A secondary battery was produced under the same conditions as in Example 1-3 except for changing the modification method to an electrochemical doping method, and the cycle performance and first efficiency were evaluated. In the electrochemical doping method, the bulk modification apparatus shown in FIG. 6 was used.

Incidentally, $Li_4SiO_4$ was contained in the interior of the silicon compound particles in the negative electrode active material particles of Example 2-2 and Example 11-1. In the silicon compound particles in the negative electrode active material particles of Example 1-3, $Li_2SiO_3$ and $Li_2Si_2O_5$ were contained.

TABLE 11

| Table 11 | Half value width (°) | Si (111) crystallite size (nm) | Modification method | Capacity retention rate (%) | Initial efficiency (%) | Times till gas generation |
|---|---|---|---|---|---|---|
| Example 2-2 | 1.755 | 4.86 | Oxidation & reduction | 82.0 | 86.4 | 72 hours |
| Example 11-1 | 2.257 | 3.77 | Electrochemical doing | 81.8 | 86.3 | 72 hours |
| Example 1-3 | 2.257 | 3.77 | Thermal doping | 81.0 | 86.7 | 120 hours |

SiOx x = 1 $D_{50}$ = 4 μm, Graphite (natural graphite: artificial graphite = 5:5) $D_{50}$ = 20 μm, SiOx ratio 10 mass %, carbon material average thickness 100 nm, dQ/dV exists, aluminum phosphorous composite oxide $D_{50}$ = 0.8 μm, total amount of aluminum phosphorous composite oxide 1.50 mass %, $P_2O_5/Al_2O_3$ (mass ratio) 1.70, Al 2p 80.5 eV, P 2p 140.5 eV When oxidation and reduction method or electrochemical doping method was used, favorable battery properties were obtained.

Example 12-1

A secondary battery was produced under the same conditions as in Example 1-3 except for changing the mass ratio of the negative electrode active material particles in the negative electrode active material, and the increment rates of the battery capacities were evaluated.

FIG. 5 is a graph showing relationship between the ratio of silicon-based negative electrode active material particles relative to the whole amount of negative electrode active material and an increment rate of battery capacity of the secondary battery. The graph indicated by A in FIG. 5 shows an increment rate of the battery capacity of the negative electrode when the ratio of the silicon compound particles was increased in the inventive negative electrode active material. On the other hand, the graph indicated by B in FIG. 5 shows an increment rate of the battery capacity of the negative electrode when the ratio of the silicon compound particles without doping Li was increased. As can be seen from FIG. 5, when the ratio of the silicon compound particles was 6 mass % or more, the increment rate of battery capacity was larger compared to previous one, particularly, the volume energy density was increased remarkably.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode active material comprising:
   a negative electrode active material particle comprising:
      a silicon compound particle containing:
         a silicon compound that contains an oxygen, and
         a Li compound; and
   aluminum phosphorous composite oxide attached to at least part of the surface of the negative electrode active material particle, wherein a mass ratio of $P_2O_5$ and $Al_2O_3$ in the aluminum phosphorous composite oxide as expressed as a composite of $P_2O_5$ and $Al_2O_3$ is in a range of 1.50≤mass of the $P_2O_5$/mass of the $Al_2O_3$<3.0 as measured by analyzing the aluminum phosphorous composite oxide by inductively coupled plasma optical emission spectrometry or inductively coupled plasma mass spectrometry,
   wherein the negative electrode active material particle including aluminum phosphorous composite oxide has at least one peak in a region of a binding energy of more than 135 eV and 144 eV or less in a P 2p peak shape given in an X-ray photoelectron spectroscopy.

2. The negative electrode active material according to claim 1, wherein the negative electrode active material particle including aluminum phosphorous composite oxide has at least one peak in a region of a binding energy of 65 eV or more and 85 eV or less in an Al 2p peak shape given in an X-ray photoelectron spectroscopy.

3. The negative electrode active material according to claim 1, wherein the negative electrode active material particle including aluminum phosphorous composite oxide has a peak at an energy position higher than a binding energy of 74 eV in an Al 2p peak shape given in an X-ray photoelectron spectroscopy.

4. The negative electrode active material according to claim 1, wherein the mass ratio of the $P_2O_5$ and the $Al_2O_3$ is in a range of 1.50≤mass of the $P_2O_5$/mass of the $Al_2O_3$<2.5.

5. The negative electrode active material according to claim 1, wherein the aluminum phosphorous composite oxide is contained in a range of 5 mass % or less relative to the negative electrode active material particle.

6. The negative electrode active material according to claim 1, wherein the aluminum phosphorous composite oxide has a median diameter of 1.2 μm or more and 5.5 μm or less.

7. The negative electrode active material according to claim 1, wherein the silicon compound particle contains at least one of $Li_2SiO_3$, $Li_4SiO_4$, and $Li_2Si_2O_5$.

8. The negative electrode active material according to claim 1, wherein the silicon compound contains silicon and oxygen in a ratio in a range of $SiO_x$:0.5≤x≤1.6.

9. The negative electrode active material according to claim 1, wherein the silicon compound particle has a diffraction peak attributable to Si(111) crystal face in which the half value width (2θ) is 1.2° or more in an X-ray diffraction using Cu-Kα ray, and the size of the crystallite corresponding to the crystal face is 7.5 nm or less.

10. The negative electrode active material according to claim 1, wherein the silicon compound particle satisfies a relationship of A >B where A is a maximum peak intensity derived from Si and Li silicate region given in the chemical shift value of −60 to −95 ppm, and B is a peak intensity derived from $SiO_2$-region given in the chemical shift value of −96 to −150 ppm, each obtained from a $^{29}$Si-MAS-NMR spectrum.

11. The negative electrode active material according to claim 1, wherein the negative electrode active material has a structure such that a test cell composed of a negative electrode containing a mixture of the negative electrode active material and a carbon-based active material, together with a lithium counter electrode, exhibits a peak at an electric potential V of the negative electrode ranging from 0.40 V to 0.55 V in discharging at X times or later (1≤X≤30) in a graph of a relationship between a derivative dQ/dV of a discharging capacity Q with respect to the electric potential V of the negative electrode on the basis of the lithium counter electrode, together with the electric potential V in each charging and discharging, the graph being constructed by subjecting the test cell to charging and discharging for 30 times where current flows in a direction in which the lithium is inserted into the negative electrode active material in the charging and current flows in a direction in which the lithium is extracted from the negative electrode active material in the discharging.

12. The negative electrode active material according to claim 1, wherein the median diameter of the negative electrode active material is 1.0 μm or more and 15 μm or less.

13. The negative electrode active material according to claim 1, wherein the negative electrode active material particle has a surface layer portion containing a carbon material.

14. The negative electrode active material according to claim 13, wherein the average thickness of the carbon material is 5 nm or more and 5000 nm or less.

15. A mixed negative electrode active material, comprising the negative electrode active material according to claim 1 and a carbon-based active material.

16. A method of producing a negative electrode active material containing a negative electrode active material particle including a silicon compound particle, comprising the steps of:
- preparing negative electrode active material particles each containing a lithium inserted silicon compound particle, comprising:
  - preparing a silicon compound particle containing a silicon compound that contains an oxygen,
  - inserting lithium into the silicon compound particle,
- attaching aluminum phosphorous composite oxide onto at least part of the surfaces of the negative electrode active material particles, wherein a mass ratio of $P_2O_5$ and $Al_2O_3$ in the aluminum phosphorous composite oxide as expressed as a composite of $P_2O_5$ and $Al_2O_3$ is in a range of 1.50≤mass of the $P_2O_5$/mass of the $Al_2O_3$<3.0 as measured by analyzing the aluminum phosphorous composite oxide by inductively coupled plasma optical emission spectrometry or inductively coupled plasma mass spectrometry, and
- selecting a negative electrode active material particle having at least one peak in a region of a binding energy of more than 135 eV and 144 eV or less in a P 2p peak shape given in an X-ray photoelectron spectroscopy from the negative electrode active material particles on which the aluminum phosphorous composite oxide is attached.

17. The method of producing a negative electrode active material according to claim 16, wherein the aluminum phosphorous composite oxide used in the step of attaching is a mixture of aluminum tertiary phosphate and aluminum metaphosphate.

* * * * *